US006930801B2

(12) United States Patent
Inoue

(10) Patent No.: US 6,930,801 B2
(45) Date of Patent: Aug. 16, 2005

(54) METHOD OF DETERMINING THRESHOLD ARRANGEMENT FOR GENERATING GRADATION IMAGE, AND APPARATUS FOR GENERATING GRADATION IMAGE DATA

(75) Inventor: Yoshiaki Inoue, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 1085 days.

(21) Appl. No.: 09/775,615

(22) Filed: Feb. 5, 2001

(65) Prior Publication Data

US 2001/0012129 A1 Aug. 9, 2001

(30) Foreign Application Priority Data

Feb. 3, 2000 (JP) ........................................ 2000-026847

(51) Int. Cl.[7] .......................... H04N 1/405; H04N 1/409
(52) U.S. Cl. ........................ 358/3.14; 358/3.2; 358/3.26
(58) Field of Search ............................. 358/3.13, 3.14, 358/3.19, 3.2, 3.26, 1.9, 3.06, 533–536; 382/191, 275, 237, 270

(56) References Cited

U.S. PATENT DOCUMENTS

| 5,555,103 | A | * | 9/1996 | Anderson | 358/3.19 |
| 6,172,770 | B1 | | 1/2001 | Inoue | 358/1.9 |
| 6,717,696 | B1 | * | 4/2004 | Wang et al. | 358/1.9 |
| 2002/0186417 | A1 | * | 12/2002 | Inoue | 358/3.14 |
| 2002/0186418 | A1 | * | 12/2002 | Inoue | 358/3.14 |
| 2004/0085588 | A1 | * | 5/2004 | Loce et al. | 358/3.19 |

FOREIGN PATENT DOCUMENTS

| JP | 8-317212 | 11/1996 | .......... H04N/1/405 |
| JP | 9-200518 | 7/1997 | .......... H04N/1/405 |
| JP | 11-112814 | 4/1999 | .......... H04N/1/409 |

OTHER PUBLICATIONS

Adobe Press Mountain View California; "Post Screening" Peter Fink; published by MDN Corporation Aug. 11, 1994; pp. 97–106 Japanese Version and pp. 89–98 the English version.
IEEE Transactions on Systems, Man, and Cybernetics; "Design of Minimum Visual Modulation Halftone Paterns" J. Sullivan, et al.; vol. 21; No. 1; pp. 33–38; 1991.

* cited by examiner

*Primary Examiner*—Scott A. Rogers
(74) *Attorney, Agent, or Firm*—Sughrue Mion, PLLC

(57) ABSTRACT

A threshold arrangement capable of reducing a moiré pattern produced by an interference between the output resolution and halftone frequency of an image outputting apparatus is determined. Halftone dot image data is generated by a threshold arrangement determined up to a certain gradation, and low-frequency component data is extracted from the halftone dot image data by an FFT, a LPF, and an IFFT. The position of a threshold where the extracted low-frequency component data is smaller is determined as the position of the threshold for a next gradation. The process of determining the position of the threshold is a process in a real space, and can determine the position of the threshold for the next gradation accurately. The threshold arrangement thus determined minimizes a moiré pattern which is an unwanted low-frequency component in a gradation image that is generated using the threshold arrangement.

28 Claims, 16 Drawing Sheets

METHOD OF DETERMINING THRESHOLD ARRANGEMENT FOR GENERATING GRADATION IMAGE, AND APPARATUS FOR GENERATING GRADATION IMAGE DATA

BACKGROUND OF THE INVENTION

1. Field of the Invention

The present invention relates to a method of determining a threshold arrangement for generating a gradation image and an apparatus for generating gradation image data, which are preferably applicable to a printing apparatus such as a color scanner, an image setter, a CTP (Computer To Plate) outputting machine, a CTC (Computer To Cylinder) printing press, a DDCP apparatus, etc.

2. Description of the Related Art

Halftone dot image outputting apparatus such as image setters or the like produce a halftone dot image of binary values (e.g., black and non-black areas produced by turning on and off a laser beam) on a printing sheet or a film. It has been pointed out that an image outputted by such a halftone dot image outputting apparatus suffers a moiré pattern produced by an interference between the output resolution of the apparatus and a screen ruling (see Japanese laid-open patent publication No. 8-317212).

The output resolution refers to the resolution of the image outputting apparatus, and is defined by dpi (dots per inch), pixels/inch which has the same meaning as dpi, or pixels/mm or the like. The screen ruling is defined by lines/inch, which can be converted into lines/mm, representing the number of rows of halftone dots (also referred to as halftone dot cells) per unit length (inch), and is also referred to as lpi (lines per inch), a ruling, a screen frequency, or a halftone dot frequency.

The moiré pattern produced by an interference between the output resolution and the screen ruling is a periodic pattern of halftone dots, i.e., a periodic interference pattern caused between a halftone dot pitch and a scanning line pitch. The moiré pattern acts as a low-frequency noise component that degrades the quality of the image.

The inventor of the present invention has proposed techniques to reduce the low-frequency noise component as disclosed in Japanese laid-open patent publication No. 8-317212 (hereinafter referred to as "first technique"), Japanese laid-open patent publication No. 9-200518 (hereinafter referred to as "second technique"), and Japanese laid-open patent publication No. 11-112814 (hereinafter referred to as "third technique").

According to the first technique, the positions of thresholds in a threshold arrangement (also referred to as "threshold template" or "threshold matrix") that is used to generate binary halftone dot image data are modified to equalize, as much as possible, the numbers of pixels to be blackened or unblackened in the threshold arrangement for thereby reducing the low-frequency noise component.

According to the second technique, when thresholds are arranged in the threshold arrangement according to the first technique, random numbers are added to further reduce the low-frequency noise component.

According to the third technique, the central value of a given threshold correction range in existing thresholds to be corrected in a threshold arrangement and the thresholds to be corrected are compared with each other for magnitude to convert the thresholds into halftone dot image data. The halftone dot image data are then converted into data in a frequency space, from which data containing a low-frequency noise component whose frequency is lower than the fundamental frequency component of halftone dots are extracted and converted into image data in a real space. The image data in the real space and the thresholds to be corrected are observed in the given threshold correction range, and a pair of thresholds to be replaced, i.e., a pair of thresholds at positions where pixels having maximum and minimum values of the image data in the real space, are selected and replaced with each other to obtain a corrected threshold arrangement.

The corrected threshold arrangement produced by the third technique is a threshold arrangement that is less likely to produce a low-frequency noise component.

While the first and second techniques can achieve respective certain reduced levels of the low-frequency component, they have been desired to accomplish a further reduced level of the low-frequency component if images of higher quality are handled.

The third technique is capable of considerably reducing the low-frequency noise component. However, since the third technique is a technique to correct already generated thresholds, the degree of freedom of correcting those thresholds is limited, resulting in a possibility that no sufficient noise reduction capability may be achieved.

SUMMARY OF THE INVENTION

It is therefore an object of the present invention to provide a method of determining a threshold arrangement for generating a gradation image by initially generating a threshold arrangement that is less likely to produce a low-frequency noise component, i.e., less likely to produce a moiré pattern when a gradation image is outputted, rather than by correcting an existing threshold arrangement.

Another object of the present invention is to provide an apparatus for generating gradation image data to suppress the generation of a low-frequency component such as a moiré pattern in a gradation image that is generated based on the gradation image data.

According to an aspect of the present invention, there is provided a method of determining a threshold arrangement for generating a gradation image to determine a position of at least one threshold of the same value for a next gradation when positions of thresholds ranging from a smaller threshold to a threshold for a given gradation are determined in a threshold arrangement, comprising the steps of (A) determining at least one candidate position for the position of at least one threshold of the same value for the next gradation, and (B) determining the position of the threshold for the next gradation from the candidate position, the step (B) comprising the steps of extracting a low-frequency component from image data obtained based on the threshold arrangement in which the positions of the thresholds ranging to the threshold for the given gradation are determined, determining a low-frequency component intensity at the at least one candidate position, determining the candidate position where the determined low-frequency component intensity is weakest as the position of the threshold for the next gradation; and repeating the step of extracting a low-frequency component, the step of determining a low-frequency component intensity, and the step of determining the candidate position until all positions of at least one threshold of the same value for the next gradation are determined.

The letters "A", "B" (and "C") used in connection with the steps described above and below are given by way of illustration only for an easier understanding of the present invention.

The above step of determining the candidate position where the determined low-frequency component intensity is weakest as the position of the threshold for the next gradation is a process in a real space, and can determine the position of the threshold for the next gradation accurately.

The threshold arrangement thus determined minimizes a moiré pattern which is an unwanted low-frequency component in a gradation image that is generated using the threshold arrangement.

Instead of determining thresholds from the smaller threshold, which may be the smallest threshold, in the order of increasing magnitudes, thresholds may be determined from the greater threshold, which may be the greatest threshold, in the order of decreasing magnitudes by determining the candidate position where the determined low-frequency component intensity is strongest as the position of the threshold for the next gradation.

According to another aspect of the present invention, there is also provided a method of determining a threshold arrangement for generating a gradation image to determine a position of at least one threshold for a next gradation when positions of thresholds ranging from a smaller threshold to a threshold for a given gradation are determined in a threshold arrangement, comprising the steps of extracting a low-frequency component from image data obtained based on the threshold arrangement in which the positions of the thresholds ranging to the threshold for the given gradation are determined, and determining the position where the intensity of the extracted low-frequency component is weakest as the position of the threshold for the next gradation.

The above step of determining the position where the intensity of the low-frequency component is weakest as the position of the threshold for the next gradation is a process in a real space, and can determine the position of the threshold for the next gradation accurately.

The threshold arrangement thus determined minimizes an unwanted low-frequency component in a gradation image that is generated using the threshold arrangement.

Rather than determining thresholds from the smaller threshold, which may be the smallest threshold, in the order of increasing magnitudes, thresholds may be determined from the greater threshold, which may be the greatest threshold, in the order of decreasing magnitudes by determining the candidate position where the determined low-frequency component intensity is strongest as the position of the threshold for the next gradation.

According to still another aspect of the present invention, there is also provided an apparatus for generating gradation image data, comprising a recording medium for storing a plurality of threshold arrangements for generating gradation image data, selecting means for selecting a threshold arrangement from the threshold arrangements stored in the recording medium, and gradation image data generating means for generating gradation image data using the threshold arrangement selected by the selecting means, wherein each of the threshold arrangements stored in aid recording medium comprises such a threshold arrangement that a low-frequency component is extracted from gradation image data generated by the gradation image data generating means based on a threshold arrangement ranging from a smaller threshold to a threshold for a given gradation, and thereafter the position of a threshold for a gradation next to the given gradation is a position where a low-frequency component is weakest among the extracted low-frequency component.

With the above apparatus, a low-frequency component such as a moiré pattern is minimized in a gradation image that is generated from gradation image data outputted by the apparatus.

While thresholds for a next gradation are determined in the order of increasing magnitudes in the above apparatus, they may be determined in the order of decreasing magnitudes.

When a dot pattern for a certain gradation is determined, all the thresholds may be determined in the order of increasing magnitudes for lower gradations and in the order of decreasing magnitudes for higher gradations.

When the two dot patterns at a plurality of different gradations are determined, the positions of thresholds between different gradations may be determined in the order of increasing magnitudes from a threshold for the lower gradation and in the order of decreasing magnitudes from a threshold for the higher gradation.

If the threshold arrangement in the present invention comprises a threshold arrangement for generating a halftone dot gradation image, then an unwanted low-frequency component is minimized in a halftone dot image that is generated using the threshold arrangement.

If the threshold arrangement in the present invention comprises a dither matrix, then an unwanted low-frequency component is minimized in a gradation image that is generated using the dither matrix.

If the low-frequency component is weighted according to human visual characteristics and then extracted, then the low-frequency component can easily be visually recognized by human beings.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

For an easier understanding of the present invention, a basic structure of a platemaking system which incorporates a supercell threshold template according to the present invention will briefly be described below.

Figure 1:
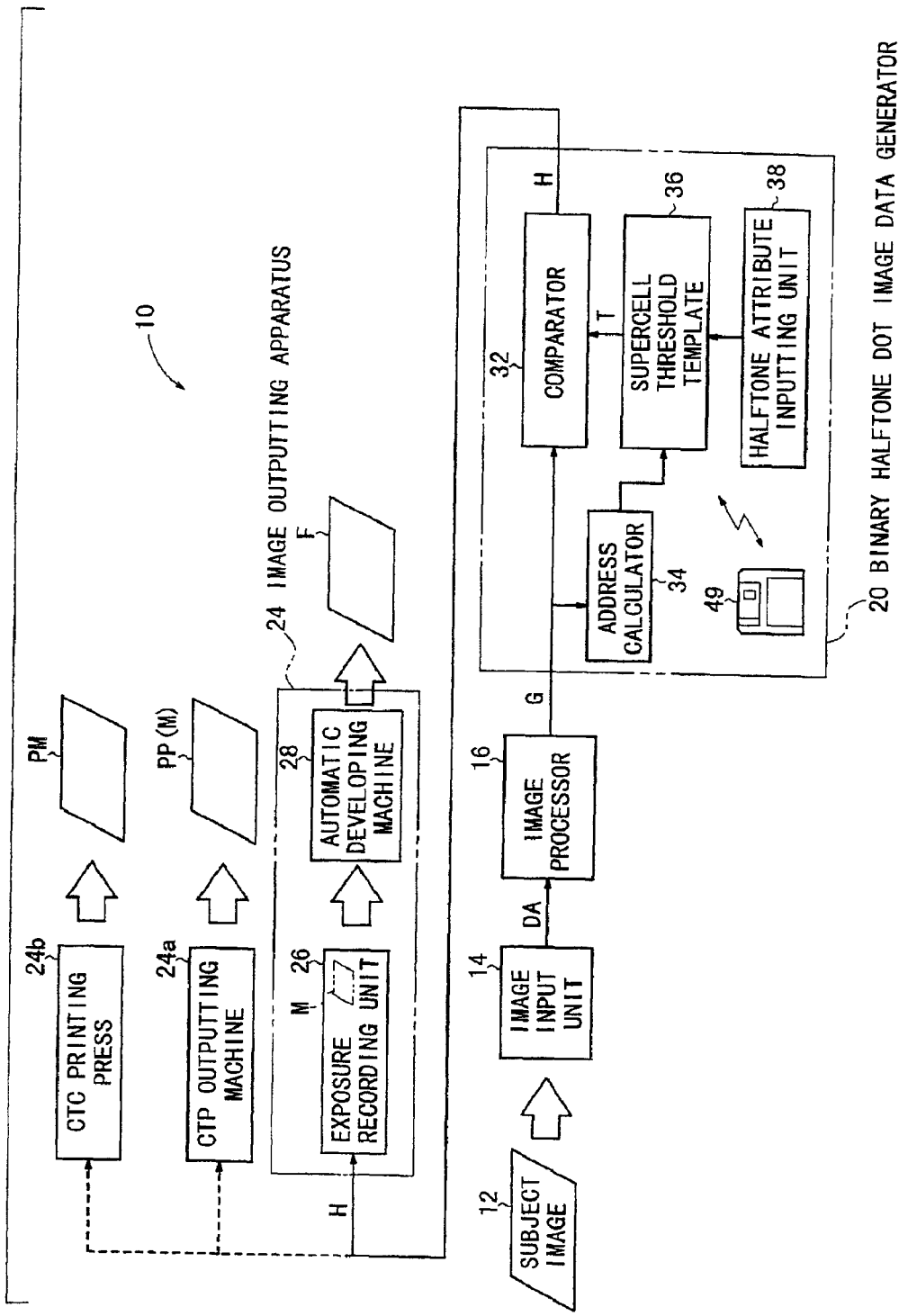
FIG. 1 is a block diagram of a platemaking system which incorporates a supercell threshold template according to the present invention.

FIG. 1 shows in block form a basic structure of a platemaking system 10 which incorporates a supercell threshold template (supercell threshold arrangement) 36 according to the present invention.

As shown in FIG. 1, the platemaking system 10 basically comprises an image input unit 14, an image processor 16, a binary halftone dot image data generator 20, and an image outputting apparatus 24. The platemaking system 10 reads an image from a subject image 12 through the image input unit 14, and forms the read image as a halftone dot image on a film F.

The image input unit 14 may comprise a scanner. In the image input unit 14, light emitted from a light source is applied to the subject image 12 while the subject image 12 is being fed in an auxiliary scanning direction, and light that is reflected by or passes through the subject image 12 is led to a photoelectric transducer such as a linear image sensor or the like. The photoelectric transducer is electrically scanned to convert the light into an electric image signal (pixel signal). The image signal is then converted by an A/D converter into 8-bit digital image data DA whose values are in the range from 0 to 255.

The image input unit 14 is not limited to such a scanner, but may comprise an image recording disk (image recording medium) such as a DVD, a communication network, a digital still camera, or any of various mediums capable of outputting digital image data.

The image data DA outputted from the image input unit 14 is supplied to the image processor 16, which processes the image data DA for color correction, sharpness processing, and resolution conversion for compatibility with the resolution of the image outputting apparatus 24, thereby generating image data G.

It is assumed that the resolution of the image outputting apparatus 24, i.e., the output resolution, is 72 scanning lines/mm, for example. Since the unit "scanning lines/mm" may be confused with the unit of the screen ruling, the unit of the output resolution will hereinafter be represented by 72 dpm (dots/mm). One dot indicates one pixel.

The image data G generated by the image processor 16 is supplied to the binary halftone dot image data generator 20 that serves as an apparatus for generating gradation image data. Processed image data outputted from any of various mediums capable of outputting digital image data, such as a digital still camera, may be directly supplied as the image data G to the binary halftone dot image data generator 20.

The binary halftone dot image data generator 20 may be software-implemented by a computer or hardware-implemented, or may be of a hybrid design that is both software-implemented and hardware-implemented.

The binary halftone dot image data generator 20 comprises a comparator 32 functioning as a gradation image data generating means, an address calculator 34, a supercell threshold template (threshold arrangement) 36 functioning as a storage medium for storing a plurality of threshold arrangements for generating gradation image data, and a halftone attribute inputting unit 38 functioning as a selecting means for selecting a desired threshold arrangement.

The image data G supplied to the binary halftone dot image data generator 20 is supplied to a comparison input terminal of the comparator 32, and also supplied to the address calculator 34 which calculates addresses AD=AD(x, y), i.e., x- and y-axis addresses, on the supercell threshold template 36.

The supercell threshold template 36 reads a threshold, which is represented by 8-bit threshold data T (more precisely, 7-bit threshold data) whose value is in the range from 1 to 255, stored in the address AD calculated by the address calculator 34, and supplies the read threshold data T to a reference input terminal of the comparator 32.

The supercell threshold template 36 is selected from a plurality of available supercell threshold templates as corresponding to halftone attributes, which include a screen ruling, a screen angle, and a screen configuration, specified by the halftone attribute inputting unit 38. In the illustrated embodiment, the specified halftone attributes include a screen ruling of 175, a screen angle of 45°, and a screen configuration of square shape.

A supercell comprises a plurality of halftone dot cells (halftone dots). Generally, in the technical field of generating halftone dots, a supercell is set on a pixel grid determined by the output resolution and divided into a plurality of halftone dot cells, and thresholds are assigned to respective pixels in the divided halftone dot cells to generate halftone dot thresholds. A supercell to which thresholds are assigned is referred to as a supercell threshold template (threshold arrangement).

For details of a process of generating halftone dots in relation to a supercell, see, for example, "POSTSCRIPT SCREENING" written by Peter Fink, published by K.K. MDN Corporation on Aug. 11, 1994, 1st Edition, 1st Printing.

By making up a supercell of a plurality of halftone dot cells, it is possible to change the screen ruling and dot angle in smaller intervals for thereby selecting values closer to indicated screen ruling and dot angle settings.

A pixel grid comprises a set of pixels as blackening units. The pixel grid may be imaged as a matrix of vertical and horizontal arrays of pixels.

In the illustrated embodiment, the supercell threshold template 36 comprise a supercell threshold template as disclosed in Japanese laid-open patent publication No. 8-317212 (first technique) and Japanese laid-open patent publication No. 9-200518 (second technique).

The comparator 32 compares the image data G and the threshold data (also referred to as the threshold) T with each other for magnitude to convert the image data G into binary halftone dot image data (also referred to as binary data, binary image data, halftone dot image data, or digital halftone dot data) H as gradation image data which has a value 1 or 0 according to the equations:

$G \geq T \rightarrow 1$(on, blackened)

$G < T \rightarrow 0$(off, blank or unblackened)

The generated binary halftone dot image data H or gradation image data is supplied to an exposure recording unit 26 in the image outputting apparatus 24.

In the exposure recording unit 26, a laser beam (recording beam) which is modulated, i.e., selectively turned on and off, depending on the binary halftone dot image data H is applied to a photosensitive medium M to form a latent halftone dot image thereon. The photosensitive medium M with the latent halftone dot image formed thereon is developed by an automatic developing machine 28 into a film F with a visible halftone dot image formed thereon. From the film F as an original plate, there is produced a printing plate, which is set in a printing press (not shown), and an ink is applied to the printing plate.

The ink applied to the printing plate is then transferred to a sheet such as a print sheet, which is then outputted as a desired printed material with the image formed on the sheet.

The present invention is applicable to not only the image outputting apparatus 24 which outputs the film F as the original plate, but also a CTP (Computer To Plate) outputting machine 24a which serves as an image outputting apparatus capable of directly outputting a printing plate PP from the binary halftone dot image data H. In the CTP outputting machine 24a, the photosensitive medium M is scanned by a laser beam (recording beam) to directly produce a printing plate PP.

The image outputting apparatus is not limited to a scanning exposure apparatus which uses a laser beam, but may comprise an apparatus for rendering an image on a film, a printing plate or a printed material based on surface exposure printing principles or ink jet printing principles.

The binary halftone dot image data H may also be supplied to a CTC (Computer To Cylinder) printing press 24b. In the CTC printing press 24b, the photosensitive medium M that is wound on a cylinder is scanned based on the binary halftone dot image data H to produce a printing plate. Then, an ink is applied to the printing plate and transferred to a sheet, which is then outputted as a desired printed material with the image formed on the sheet.

The supercell threshold template 36 of the binary halftone dot image data generator 20 is stored in and supplied from a recording medium 49 such as a floppy disk or the like.

The binary halftone dot image data generator 20 may be hardware-implemented or software-implemented on a computer. In this case, the threshold arrangement is stored in a recording medium such as a hard disk or the like.

The basic structure of the platemaking system 10 which incorporates the supercell threshold template (supercell threshold arrangement) 36 according to the present invention has been described above.

An apparatus for generating an arrangement of thresholds for generating a gradation image, which is used to carry out a method of determining an arrangement of thresholds for generating a gradation image according to the present invention, will be described below.

Figure 2:
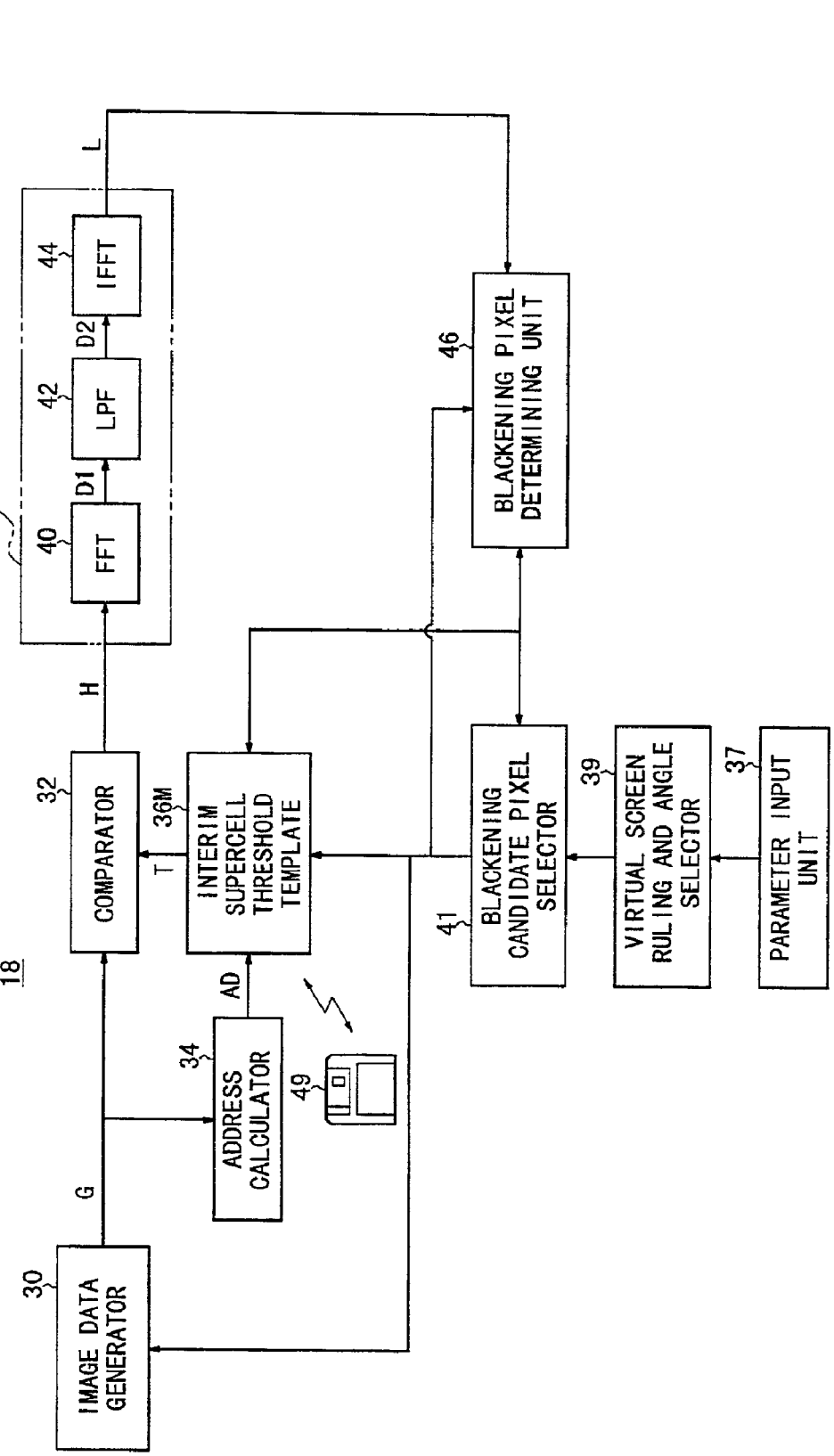
FIG. 2 is a block diagram of an apparatus for generating a threshold arrangement according to the present invention.

FIG. 2 shows in block form an apparatus 18 for generating a supercell threshold template (supercell threshold arrangement) 36 to which a plurality of thresholds T ranging from 1 to 255 are assigned, as an apparatus for generating an arrangement of thresholds for generating a gradation image.

The apparatus 18 comprises a storage medium such as a RAM (Random Access Memory), a hard disk, or the like as a storing means. The gradation image signifies a multivalued image such as a binary image, i.e., an image composed of blackened pixels and unblackened (blank) pixels, or a four-valued image, i.e., a gradation image composed of four densities 0, 1, 2, 3.

Those parts of the apparatus 18 shown in FIG. 2 which are identical to those of the platemaking system 10 shown in FIG. 1 are denoted by identical reference characters, and will not be described in detail below.

As shown in FIG. 2, the apparatus 18 comprises a parameter input unit 37 for setting input parameters including a ruling, an angle, an output resolution, a screen configuration, etc., a virtual screen ruling and angle selector 39 for selecting a virtual screen ruling and angle depending on set input parameters, and a blackening candidate pixel selector 41 for selecting blackening candidate pixels depending on a selected virtual screen ruling and angle.

The apparatus 18 also has an image data generator 30 for generating image data G having a fixed value over a size corresponding to the size of a threshold arrangement after the selection of blackening candidate pixels selected by the blackening candidate pixel selector 41, an address calculator 34 for calculating addresses AD based on the generated image data G and supplying calculated addresses AD to an interim supercell threshold template 36M, an interim supercell threshold template 36M which initially contains no thresholds T at all and then progressively stores successively determined thresholds T, and a comparator 32 for generating binary halftone dot image data H which have a value 0 or 1 from interim thresholds T, i.e., thresholds T that have already been determined, and the image data G. The already determined threshold arrangement is read from the interim supercell threshold template 36M for the supplied addresses AD.

The apparatus 18 further includes a low-frequency component extractor 45 for extracting low-frequency component data (also referred to as a low-frequency noise component, low-frequency noise data, or a low-frequency component) L from binary halftone dot image data H, and a blackening pixel determining unit 46 for calculating low-frequency components at the positions of blackening candidate pixels selected by the blackening candidate pixel selector 41 and determining the position of a next blackening pixel as the position where a threshold is arranged, based on the calculated low-frequency component.

The low-frequency component extractor 45 comprises a fast Fourier transform (FFT) unit 40 as a frequency converting means, a low-pass filter (LPF) 42, and an inverse fast Fourier transform (IFFT) unit 44 as an inverse frequency converting means. The frequency converting means is not limited to the fast Fourier transform unit 40, but may comprise a wavelet converting means. If the frequency converting means comprises a wavelet converting means, then the inverse frequency converting means should comprise an inverse wavelet converting means.

The low-frequency component extractor 45 can extract low-frequency component through filtering (convolution processing) in a real space without the need for the frequency converting means. However, though the mask size and image data size of the convolution processing are also factors to be considered, the processing time may often be shorter if the frequency converting means is used than if the convolution process is performed. An example in which the frequency converting means is used will hereinafter be described below.

The binary halftone dot image data H generated by the comparator 32 is supplied to the fast Fourier transform unit 40.

The binary halftone dot image data H is image data in a positional space (real space). Data in the positional space refers to data on coordinates defined in an xy plane. The binary halftone dot image data H in the positional space is converted by the fast Fourier transform unit 40 into data D1 as an information signal in a frequency space, which is supplied to the low-pass filter 42 whose cutoff frequency is set to a fundamental frequency component (screen ruling component) of halftone dots. Data in the frequency space refers to data on coordinates defined in the frequency space which has xy axes as frequency axes.

The low-pass filter 42 extracts data D2 containing a low-frequency component whose frequency is lower than the fundamental frequency component (screen ruling component) of halftone dots from the data D1 in the frequency space, and supplies the extracted data D2 to the inverse fast Fourier transform unit 44.

The inverse fast Fourier transform unit 44 converts the data D2 containing a low-frequency component, which has been extracted in the frequency space, into low-frequency component data L that is image data in the positional space, and supplies the low-frequency component data L to the blackening pixel determining unit 46.

The blackening pixel determining unit 46 determines a threshold arrangement based on the low-frequency component data L supplied thereto. The determined threshold arrangement is stored in the interim supercell threshold template 36M. When all the threshold arrangement ranging from 1 to 255 are determined, the interim supercell threshold template 36M is turned into a supercell threshold template with all the thresholds being determined. The supercell threshold template is stored in the recording medium 49 such as a floppy disk or the like. Subsequently, the supercell threshold template is copied from the recording medium 49 to the supercell threshold template 36 in the platemaking system 10 shown in FIG. 1, and used in the platemaking system 10.

Detailed operation of the apparatus 18 thus constructed will be described below with reference to FIG. 3.

Figure 3:
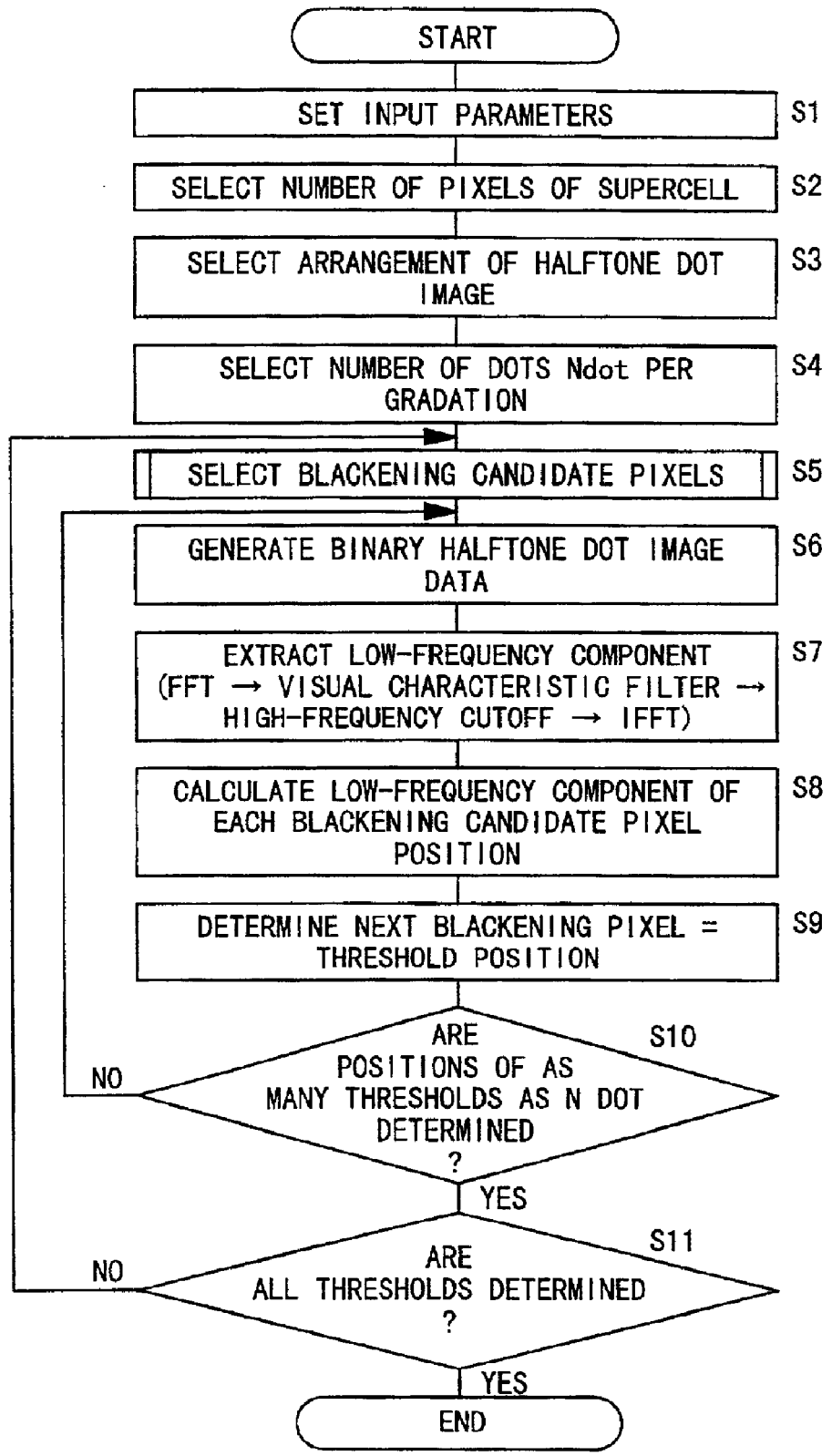
FIG. 3 is a flowchart of a processing sequence of the apparatus shown in FIG. 2.

In step S1 shown in FIG. 3, input parameters are set by the parameter input unit 37. The input parameters include a screen ruling of 175 (LPI)=6.89/mm, a screen angle of 45°, an output resolution of 72 dots/mm (pixels/mm) (one pixel has a size of 13.9 μm each side, and a screen configuration of square shape. The screen configuration may be of a circular shape or another geometric shape other than the square shape.

Then, the virtual screen ruling and angle selector 39 selects the number of pixels of a supercell (supercell threshold template 36) which is a threshold arrangement as 119 pixels×119 pixels in step S2, selects an arrangement of a halftone dot image (size, number, and angle) in step S3, and selects the number of pixels Ndot per gradation in step S4. The number of pixels Ndot per gradation is determined according to the following equation (1):

$$\text{Ndot} = \text{number of pixels of supercell/number of gradations} \quad (1)$$
$$= 119 \times 119 / 256$$
$$\approx 55$$

This means that there are 55 thresholds T to be placed in the interim supercell threshold template 36M, or stated otherwise, there are 55 thresholds T=1, T=2, ..., T=255 placed in the supercell threshold template 36.

In the present embodiment, for an easier understanding of the invention, an arrangement of thresholds T of the interim supercell threshold template 36M has been determined from T=1 to T=128, and a process of determining a position where 55 thresholds T=129 (one or more) for a next gradation are to be placed, i.e., a position where one or more thresholds of the same value are to be placed, will be described below.

In step S5 (referred to as "step A"), a plurality of candidate positions for the position where a plurality of thresholds of the same value for the next gradation are to be placed are selected so as not to impair the screen configuration. The candidate positions are referred to as blackening candidate pixels as they correspond to pixel positions of candidates to be blackened next.

If the number of blackening candidate pixels is represented by m, then it is selected as m=Ndot+α, e.g., Ndot×2=110. When the margin α is increased, the freedom of the threshold arrangement is also increased, but the blackening configuration of the screen deviates from the square shape.

Figure 4:
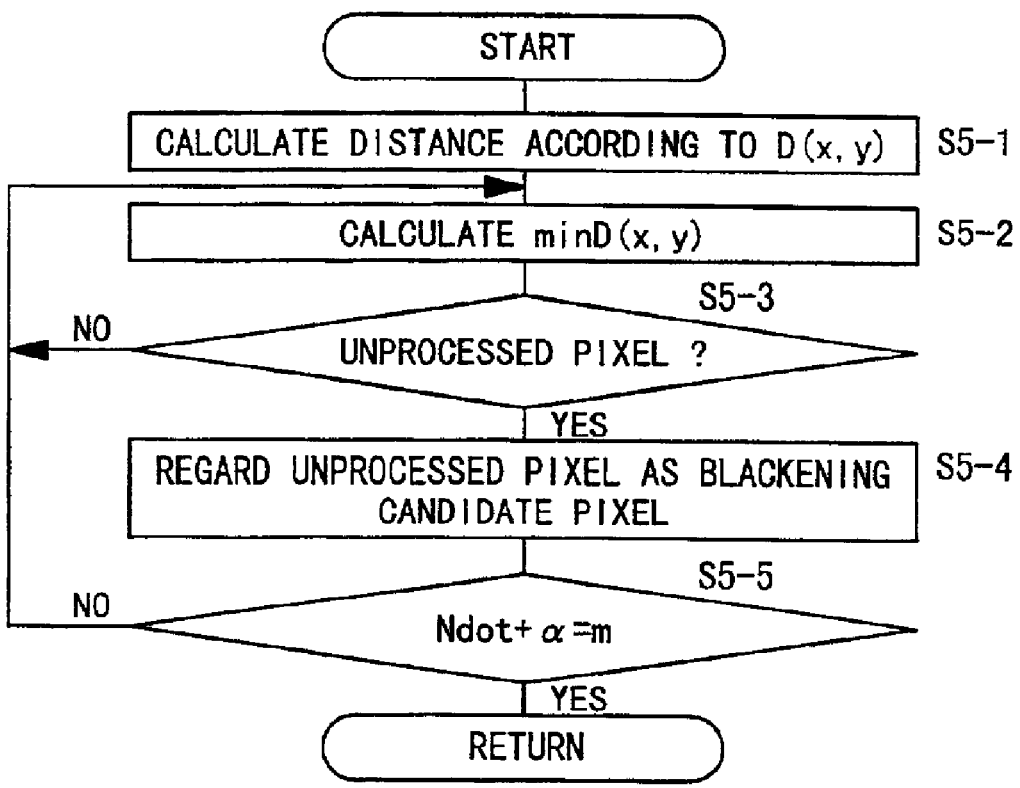
FIG. 4 is a flowchart of a process of selecting blackening candidate pixels in the processing sequence shown in FIG. 3.

FIG. 4 shows a process of selecting blackening candidate pixels by way of example.

In step S5-1 shown in FIG. 4, the distance from the center O of each halftone dot 50 (see FIG. 5) whose size has been standardized with ±1 to an unprocessed pixel, i.e., the distance from the center O to a pixel position where no threshold has been arranged yet, is determined by a distance function D(x, y) in agreement with the desired shape of square according to the following equation (2):

$$D(x, y) = 1 - (|x| + |y|) \quad (2)$$

Figure 5:
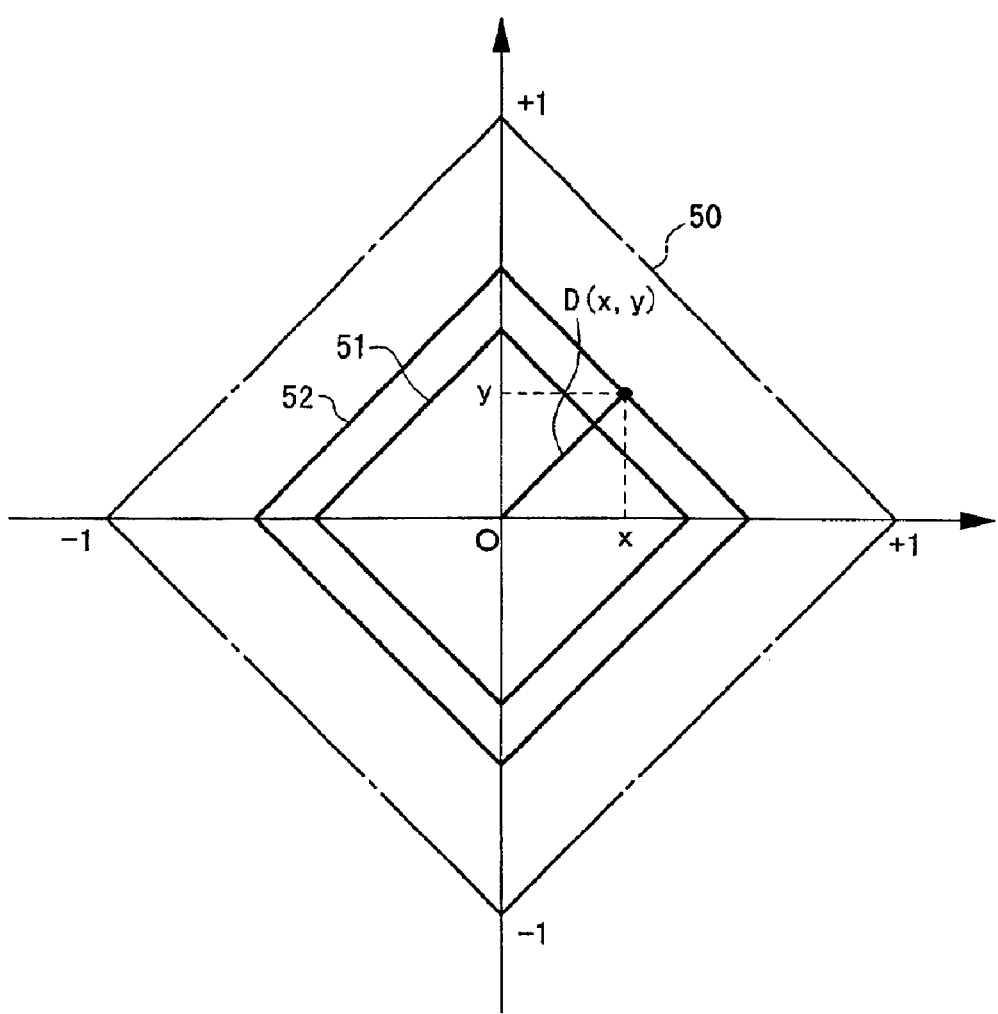
FIG. 5 is a diagram illustrative of a distance function.

In FIG. 5, if a threshold arrangement up to the inside of a square 51 including the center O has been determined, then the distance up to an unprocessed pixel near a side of a square 52 is determined by the distance function D(x, y).

If a blackening area is of a halftone dot configuration whose size increases in a circular shape, then the distance function D(x, y) may be expressed by the following equation (3):

$$D(x, y) = 1 - (x^2 + y_2) \quad (3)$$

The distance function D(x, y) corresponds to a so-called spot function.

In step S5-2, a minimum value minD(x, y) of the distances determined in step S5-1 is determined.

In step S5-3, it is confirmed whether the position where the minimum value minD(x, y) is placed is an unprocessed pixel or not, i.e., whether a threshold has been determined or not. If the position where the minimum value minD(x, y) is placed is not an unprocessed pixel, then control goes back to step S5-2. If the position where the minimum value minD(x, y) is placed is an unprocessed pixel, then it is regarded as a blackening candidate pixel in step S5-4.

In step S5-5, it is determined whether the number of blackening candidate pixels determined up to step S5-4 is equal to a blackening candidate pixel number m=Ndot+α (m=110) or not. If the number of blackening candidate pixels is less than the blackening candidate pixel number m, then the processing from step S5-2 to step S5-5 is repeated until the number of blackening candidate pixels becomes equal to the blackening candidate pixel number m.

When the number of blackening candidate pixel number m becomes equal to the blackening candidate pixel number m=Ndot+α, the blackening candidate pixel selector 41 indicates the positions of the pixels represented by the blackening candidate pixel number m to the blackening pixel determining unit 46.

Then, the processing from step S6 to step S9 (referred to as "step B") described below is repeated to determine the positions where a plurality of blackening candidate pixels (thresholds for plural candidates) are arranged.

In step S6, the comparator 32 generates binary halftone dot image data H representing a gradation image using the interim supercell threshold template 36M where an already determined threshold arrangement is stored. The image data G for generating the binary halftone dot image data H is of a value G=128. That is, a fixed value G=128 is supplied to the comparator 32 from the image data generator 30 for determining an arrangement of the threshold T=129 when the binary halftone dot image data H is generated for representing the already determined thresholds T-1 to 128.

Figure 6:
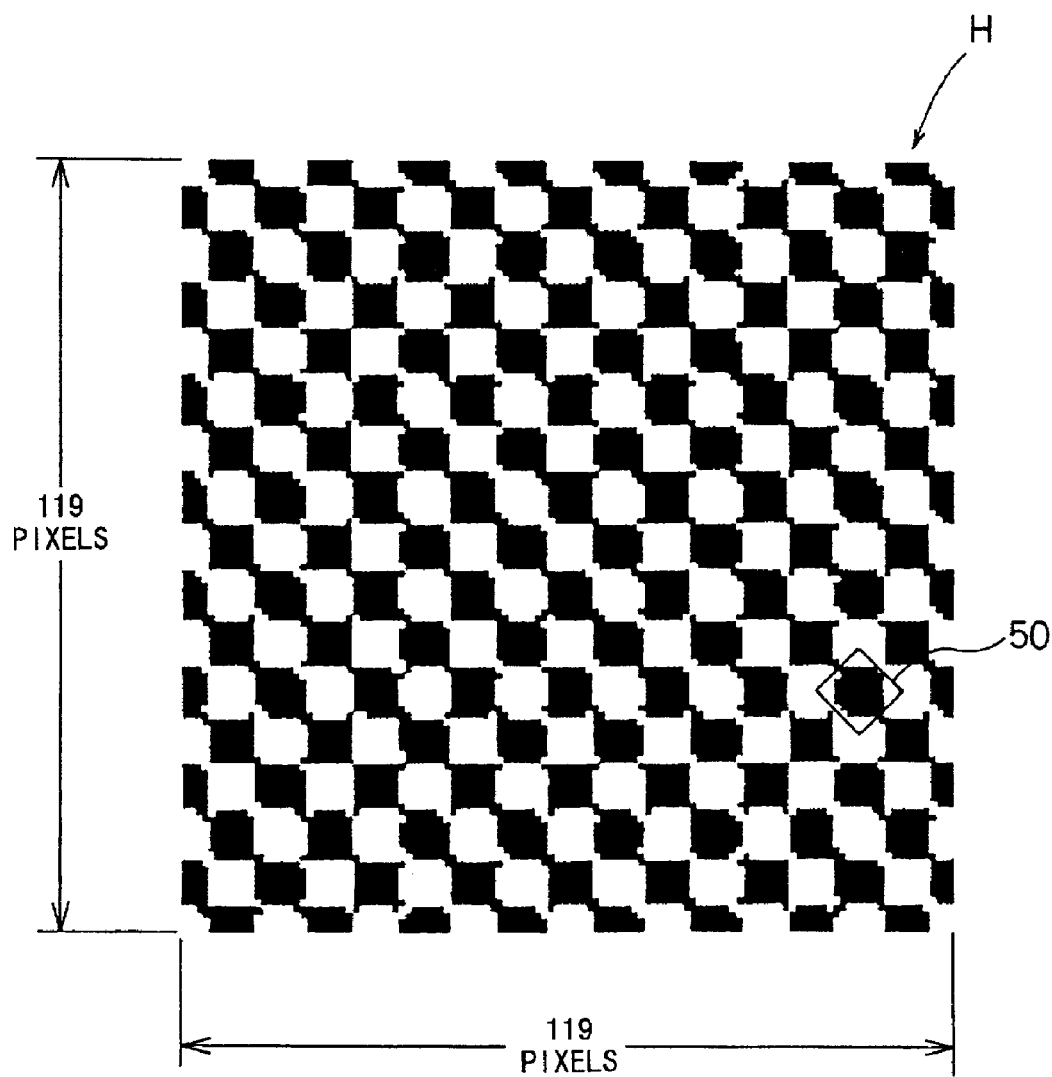
FIG. 6 is a diagram showing an image in a positional space which is represented by binary halftone dot image data before a threshold arrangement is determined.

FIG. 6 schematically shows a halftone dot image represented by the binary halftone dot image data H that is generated by the comparator 32 using the interim supercell threshold template 36M when the image data G=128.

In FIG. 6, the halftone dot image, which may be considered to be of a bit pattern, represents a screen tint with a halftone percentage of 50%, and is represented by the binary halftone dot image data H of 119 pixels×119 pixels relative to a single supercell produced by the comparator 32. The fundamental frequency of the halftone dots is essentially equal to the screen ruling, and may be considered to be 6.89 (c/mm, i.e., cycles/mm).

It can be understood from FIG. 6 that the binary halftone dot image data H comprise data on coordinates defined in an xy plane, i.e., data in the positional space (which may be considered to be data on the z axis), which are of a value 0 (unblackened) or a value 1 (blackened).

In FIG. 6, one halftone dot 50 indicated as an example contains about 109 ($145^2/13.9^2$) pixels. In step S5, the positions of the pixels represented by the blackening candidate pixel number m (m=110), which have been selected by the blackening candidate pixel selector 41 and stored in the blackening pixel determining unit 46, belong to either positions as unblackened pixels.

In step S7 (first step), the low-frequency component extractor 45 extracts a low-frequency component of the binary halftone dot image data H according to a special process. Specifically, the two-dimensional FFT 40 converts the binary halftone dot image data H into data D1 as an information signal in a frequency space.

Figure 7:
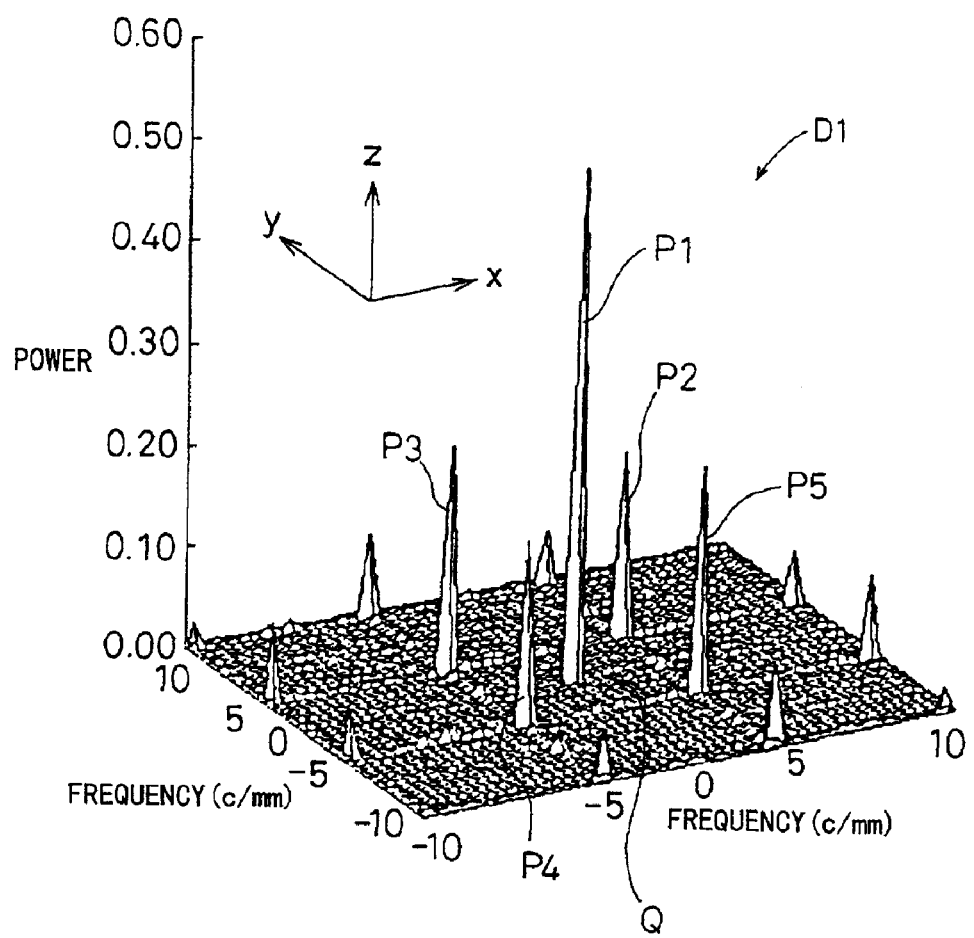
FIG. 7 is a diagram showing FFT powers produced when binary halftone dot image data before a threshold arrangement is determined are fast-Fourier-transformed.
Figure 8:
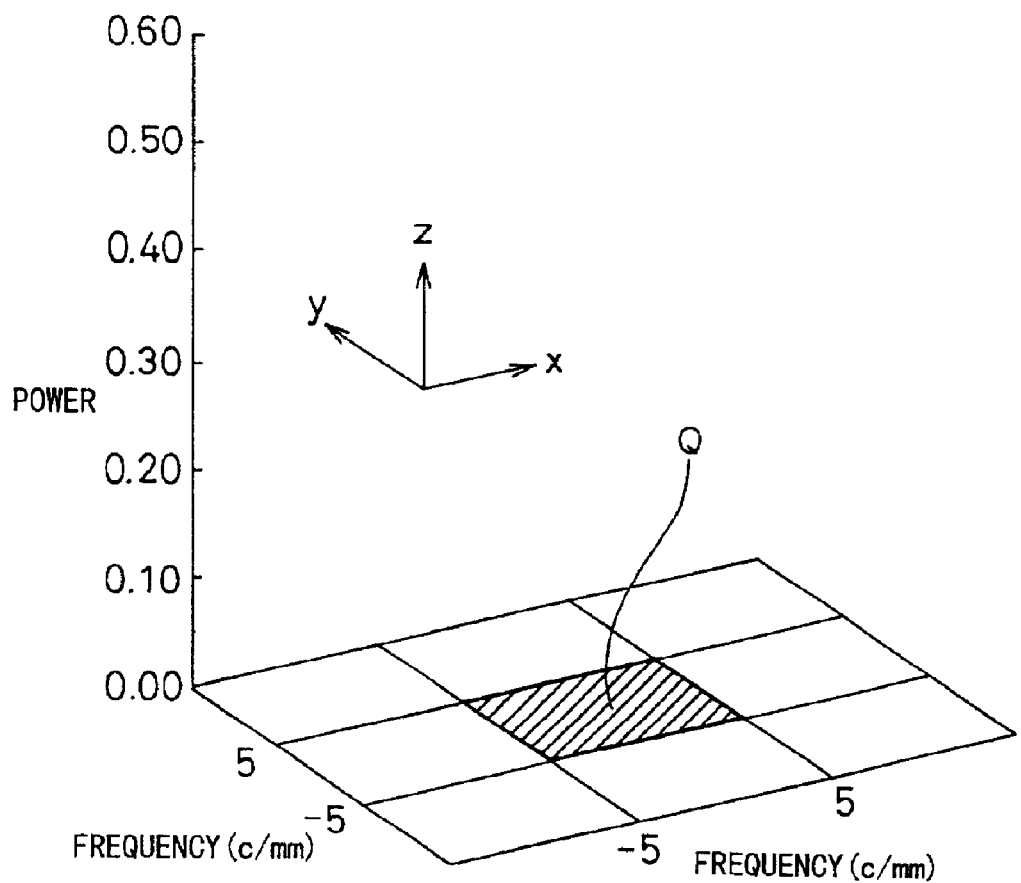
FIG. 8 is a diagram illustrative of the region of a low-frequency component to be extracted.

FIG. 7 shows FFT powers of the converted data D1 in the frequency space which corresponds to the binary halftone dot image data H in the positional space shown in FIG. 6. In FIG. 7, the x- and y-axes represent frequencies (c/mm) and the z-axis represents powers.

In the data D1 in the frequency space shown in FIG. 7, a power P1 having a value of about 0.5 at central coordinates (x, y)=(0, 0) is a fundamental component corresponding to the halftone percentage of 50% if the halftone dot image represents a screen tint, and is not noise. Powers P2–P5 having a value of about 0.2 at positions near coordinates (x, y)=(5, 5), (−5, 5), (−5, −5), (5, −5) in the directions at angles of 45° from the central coordinates (x, y)=(0,0) in the xy plane correspond to the fundamental frequency of 6.89 (c/mm) of the halftone dots, and are not noise. The coordinates (x, y) where the power P2 is present are not 5, but can be calculated as 6.89÷√2=4.87.

Considering the fact that a moiré pattern is an interference pattern produced at a frequency equal to or lower than the fundamental frequency of the halftone dots, it is understood that frequency components present in a region Q (see also a hatched region in FIG. 5) surrounded by the four coordinates (x, y)=(5, 5), (−5, 5), (−5, −5), (5, −5) are noise components (low-frequency components) related to the moiré pattern.

Figure 9:
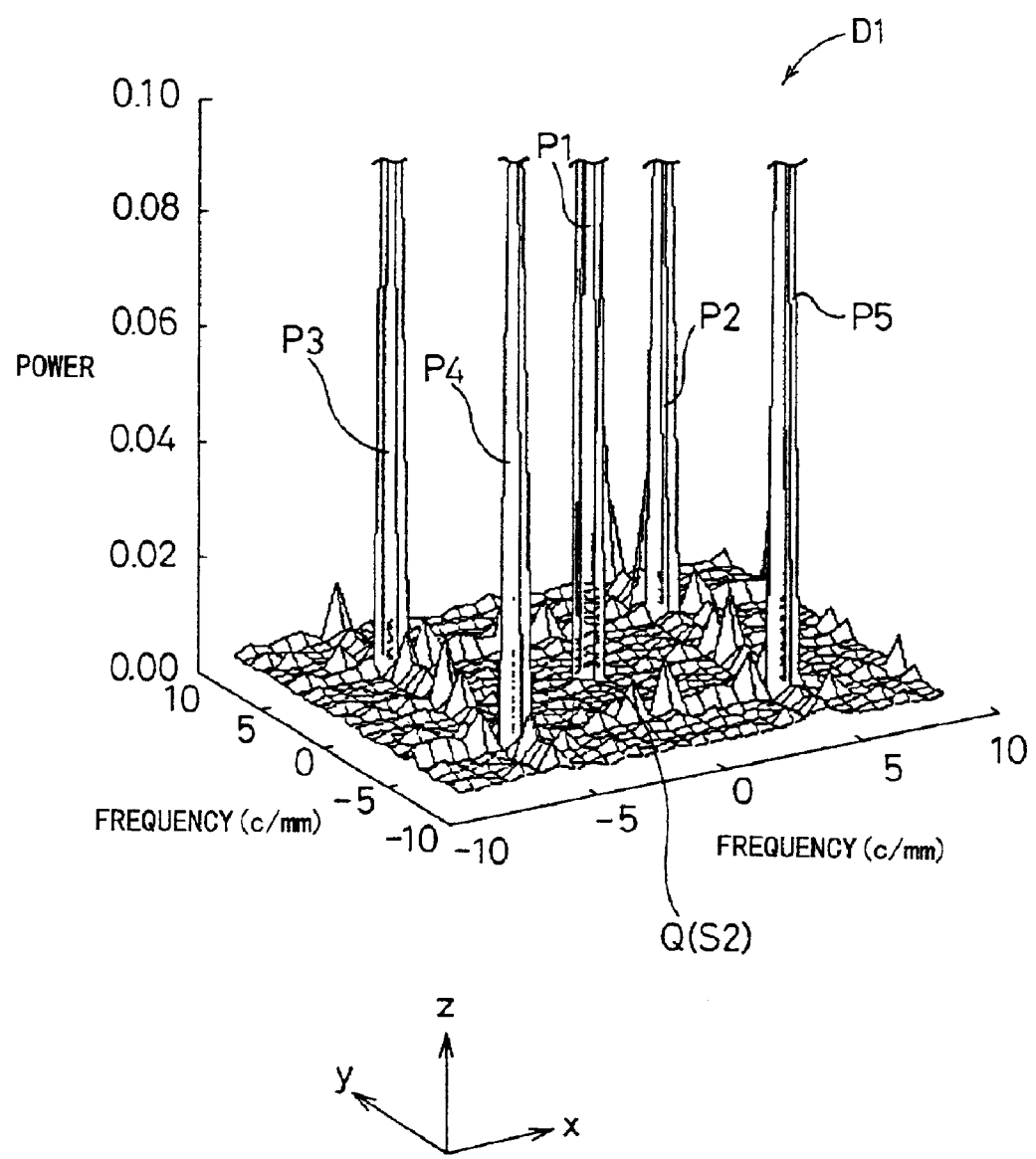
FIG. 9 is a diagram showing FFT powers in the region of a low-frequency component to be extracted which is illustrated at an enlarged scale.

FIG. 9 shows at an enlarged scale the FFT powers shown in FIG. 7 including the region Q. It can be seen from FIG. 9 that small convexities, i.e., power components, are present in the region Q.

In order to remove high-frequency components from other than the region Q, the low-pass filter 42 having a cutoff frequency corresponding to the region Q is applied to extract data D2 including the low-frequency components in the region Q. Stated otherwise, low-frequency component data D2 lower in frequency than the fundamental-frequency components of the halftone dots are extracted from the data D1 in the frequency space. At this time, the power P1 of the DC component is also removed. In view of the blocking of the DC component, the low-pass filter 42 should precisely be referred to as a bandpass filter. However, it is called a low-pass filter to indicate that it passes noise including low-frequency noise components.

Figure 10:
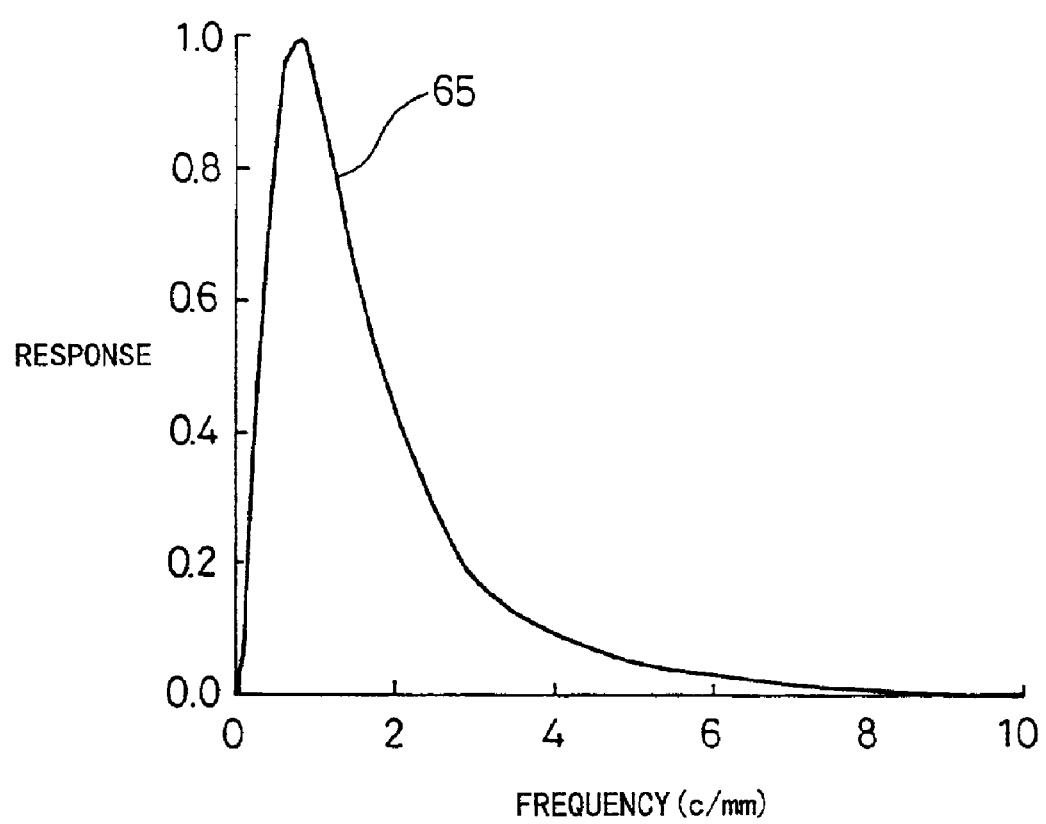
FIG. 10 is a diagram illustrative of human visual characteristics.

Actually, because a moiré pattern is perceived by human beings, when the low-pass filter 42 removes high-frequency components from other than the region Q from the data D1 converted from the binary halftone dot image data H with the FFT 40, the data D1 is weighted by human visual characteristics 65 shown in FIG. 10, and then the low-pass filter 42 is applied to extract low-frequency components. As shown in FIG. 10, the human visual characteristics 65 have a maximum sensitivity in the vicinity of the frequency of 0.8 (c/mm).

Then, the IFFT 44 converts the low-frequency component data S2 extracted by the low-pass filter 42 into low-frequency component data L in the positional space (real space) according to an inverse frequency converting process.

Figure 11:
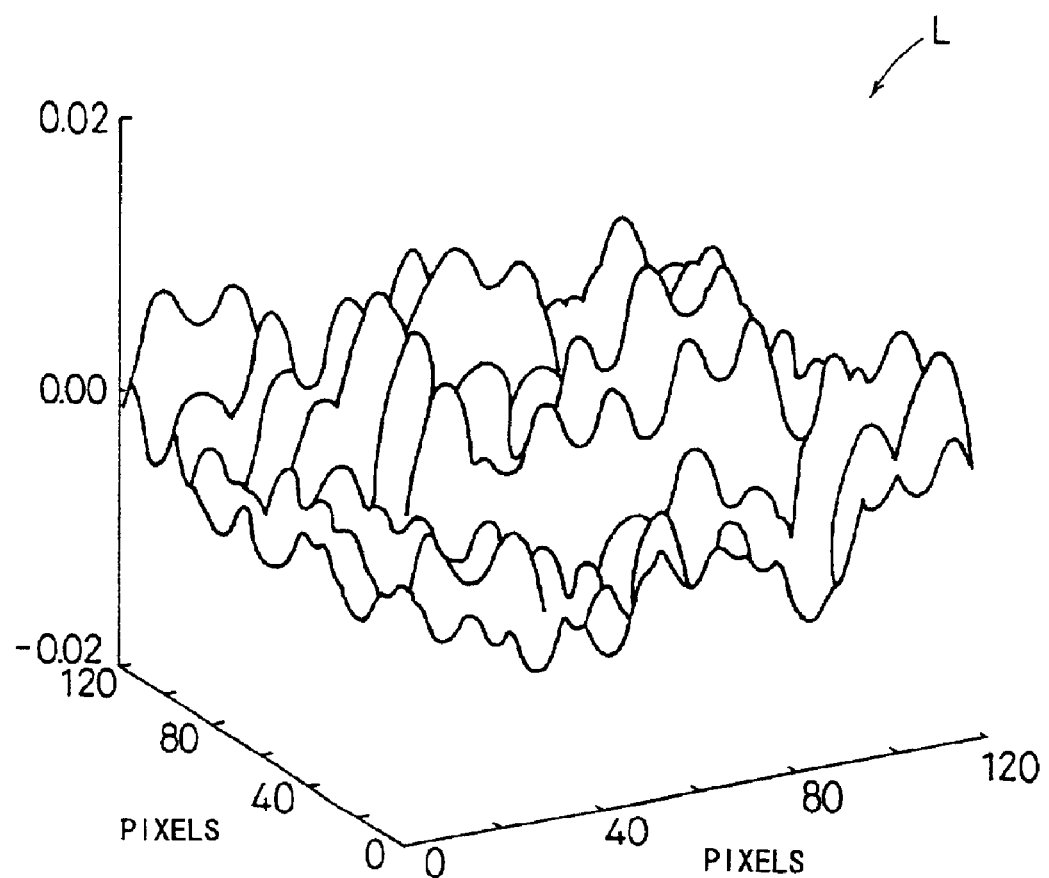
FIG. 11 is a diagram showing the configuration of a low-frequency component in a positional space which has been inverse-Fourier-transformed.

FIG. 11 shows a three-dimensional representation of the low-frequency component data L in a region of 119 pixels× 119 pixels in the positional space. It can be seen from FIG. 11 that density variations at low frequencies in the original image are extracted as peaks and valleys in the three-dimensional representation.

Since the data have been weighted according to the human visual characteristics 65 (human visual frequency characteristics) shown in FIG. 10, the three-dimensional representation shown in FIG. 11 allows the low-frequency component data L to be easily perceived by human eyes, i.e., to be easily judged for magnitudes or intensities by computers.

For details of a model of the human visual frequency characteristics, see the article "Design of minimum visual modulation halftone patterns" written by J. Sullivan, L. Ray, and R. Miller, IEEE Trans. Syst. Man Cybern. Vol. 21, No. 1. 33-38 (1991).

If the low-frequency component is weighted according to human visual characteristics and then extracted, the convolution process in a real space can also be used for the extraction instead of filtering in a frequency space as described above.

The low-frequency component data L is supplied from the low-frequency component extractor 45 to the blackening pixel determining unit 46.

In step S8 (second step), the blackening pixel determining unit 46 compares the low-frequency component data L of 119 pixels×119 pixels and the binary halftone dot image data H of 119 pixels×119 pixels shown in FIG. 6 with each other, and calculates low-frequency component data L at unblackening pixel positions corresponding to the blackening candidate pixel positions represented by the blackening candidate pixel number m=10 from the three-dimensional representation shown in FIG. 11.

Then, in step S9 (third step), the blackening pixel determining unit 46 determines the position of a blackening candidate pixel whose value is smallest, i.e., whose power value of low-frequency component data is weakest or whose low-frequency component intensity is weakest, of the low-frequency component data L at unblackening pixel positions calculated in step S8, as a pixel to be blackened (blackening pixel) next.

The next blackening pixel position is regarded as the position for placing the next threshold T=129, which is stored at a threshold position memory address in the interim supercell threshold template 36M. For a quicker process, a plurality of blackening pixels, rather than a single blackening pixel, may successively be determined in the order of increasing magnitudes.

In step S10, the blackening pixel determining unit 46 confirms whether the positions for placing as many thresholds T=129 as the number of pixels Ndot=55 per gradation in the interim supercell threshold template 36M have been determined or not. If not determined, then processing from step S6 to step S9, i.e., the first, second, and third steps, is repeated until the positions are determined. In step S6 which is repeated, the image data G outputted from the image data generator 30 is determined to be image data G=129 for the next gradation based on an indication of a determined blackening pixel from the blackening pixel determining unit 46.

If the threshold positions corresponding to all blackening pixels represented by the number of pixels Ndot per gradation have been determined, then the blackening pixel determining unit 46 confirms whether an arrangement of all thresholds T up to the maximum threshold T=255 has been determined or not. If an arrangement of all thresholds T has not been determined, then the processing from step S5 to step S10 is repeated until an arrangement of all thresholds T is determined, whereupon the processing sequence is put to an end.

The interim supercell threshold template 36M where the arrangement of all thresholds T is determined is turned into the supercell threshold template 36. The data of the supercell threshold template 36 are stored in the recording medium 49, and subsequently copied from the recording medium 49 to the supercell threshold template 36 in the platemaking system 10 shown in FIG. 1.

Then, in the same manner as described above, new parameters including a screen ruling, a screen angle, an output resolution, and a screen configuration are set in step S1, so that a threshold arrangement of the supercell threshold template 36 corresponding to those parameters can be determined substantially automatically.

In the above embodiment, the binary halftone dot image data H are processed. However, the present invention is also applicable to multivalued halftone dot image data, e.g., four-valued halftone dot image data which have output values of 0, 1, 2, 3, or eight-valued halftone dot image data.

In the above embodiment, the determination of a threshold arrangement for generating a gradation image using the halftone dot 50 shown in FIG. 6 has been described above. However, the present invention is not limited to the generation of a threshold template for generating a halftone dot image, but is also applicable to the threshold arrangement of an N×N threshold template (dither matrix) for generating a gradation image, which corresponds to N×N pixels considered to be one unit of gradation reproduction.

The dither matrix can be applied to an FM (Frequency-Modulated) screen where the density of pixels (frequency) is varied depending on the gradation.

Figure 12:
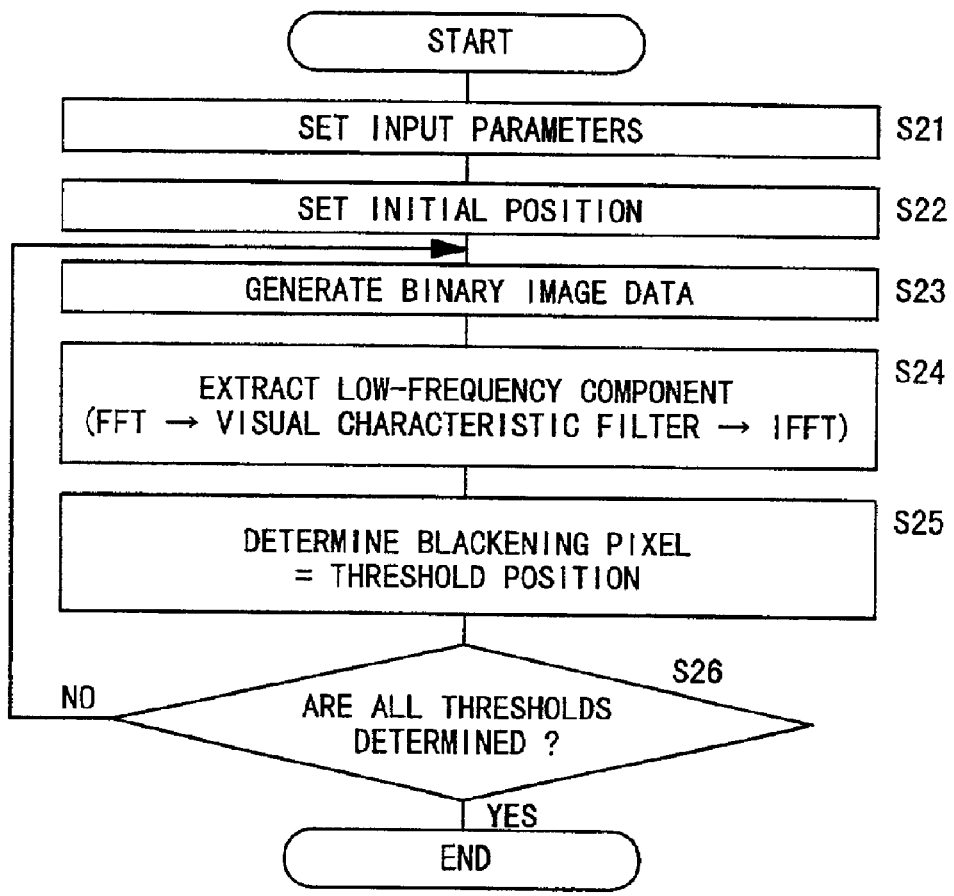
FIG. 12 is a flowchart illustrative of a process of determining the threshold arrangement of a dither matrix.

FIG. 12 shows a process of determining the threshold arrangement of such a dither matrix.

In step S21 shown in FIG. 12, input parameters are set. The input parameters include an output resolution (pixels/mm), the size of a pixel in the FM screen, and the size of the dither matrix, e.g., N×N pixels (as described above, thresholds T to be set range from 1 to $N^2$).

In step S22, an initial position of the threshold T=1 is determined at a suitable pixel position in the dither matrix.

In step S23, the comparator 32 compares the dither matrix where only the threshold T=1 is determined with image data of N×N pixels whose all pixel values are 1 to generate binary image data.

In step S24 (first step), as with the processing in step S7, low-frequency component data is extracted from the binary image data generated in step S23.

In step S25 (second step), the position of a pixel to be blackened next, i.e., the position in the dither matrix where the next threshold T=2 is to be placed, is determined. In step S25, the position where the low-frequency component data is smallest (weakest) may be determined as the position of a pixel to be blackened next.

In step S26, it is determined whether the positions where all $N^2$ thresholds are to be arranged are determined or not. Until the positions where all thresholds, i.e., from the position of the threshold T=2 to the position of the final threshold T=$N^2$, are to be arranged are determined, i.e., the processing from step S23 to step S25 is repeated.

When the thresholds are actually used, they are standardized to the number of gradations of an outputting machine. For example, if the outputting machine has 256 gradations, then a new threshold is defined as T×(255/$N^2$) where T represents an original threshold.

It is needless to say that the method of determining the threshold arrangement for a necessary number of gradations after determining the threshold arrangement of T=1 through $N^2$ can be applied to the afore-mentioned method of generating a threshold template for generating a halftone dot image.

In this manner, the threshold arrangement of the dither matrix can be determined. The dither matrix with the determined threshold arrangement is stored in the recording medium 49.

In the process of determining a threshold arrangement shown in FIG. 3 and the process of determining a threshold arrangement shown in FIG. 12, blackening pixels (threshold arrangement) are successively determined in the order of increasing halftone percentages from 0% (smallest percentage) at the threshold T=1. However, blackening pixels (threshold arrangement) may be successively determined in the order of decreasing halftone percentages from 100% (largest percentage) at the maximum threshold T.

In the apparatus 18 for generating an arrangement of thresholds shown in FIG. 2, the blackening pixel determining unit 46 and the blackening candidate pixel selector 41 may be replaced respectively with a whitening pixel determining unit and a whitening candidate pixel selector in order to determine the threshold arrangement in the order of decreasing halftone percentages.

According to such a modification, in step S9 (third step) shown in FIG. 3, of the low-frequency component data L at the respective unwhitening pixel positions calculated in step S8, the position of a whitening candidate pixel whose value is greatest, ie., whose low-frequency component data power value is strongest or whose low-frequency component intensity is strongest, may be determined by the whitening pixel determining unit (corresponding to the blackening pixel determining unit 46 in FIG. 2) as a pixel to be whitened next (whitening pixel). In step S25 (second step) shown in FIG.

12, the position of a pixel whose low-frequency component data is greatest (strongest) may be determined as the position of a pixel to be whitened next.

In the meantime, only a certain dot arrangement (binary pattern, dot pattern, halftone dot configuration, white-and-black pattern) at a certain halftone percentage (a threshold for a certain gradation) may be chosen as the most suitable dot arrangement by a certain method. Even in such case, threshold arrangements can be determined as follows.

Where a dot pattern of a threshold Tfix for a certain gradation is determined, for determining the position of a threshold Th at a next higher gradation than a determined threshold Tfix, for the certain gradation, the threshold T at the positions corresponding to the dot pattern in the threshold arrangement is all set to 0, and then positions of thresholds from Th+1 are successively determined in the order of increasing magnitudes, and for determining the position of a threshold Tl at a next lower gradation than the determined threshold Tfix, the threshold T at the positions corresponding to the dot pattern in the threshold arrangement is all set to a maximum value, e.g., $T=N^2$, and then positions of thresholds from Tl-1 are successively determined in the order of decreasing magnitudes.

Figure 13:
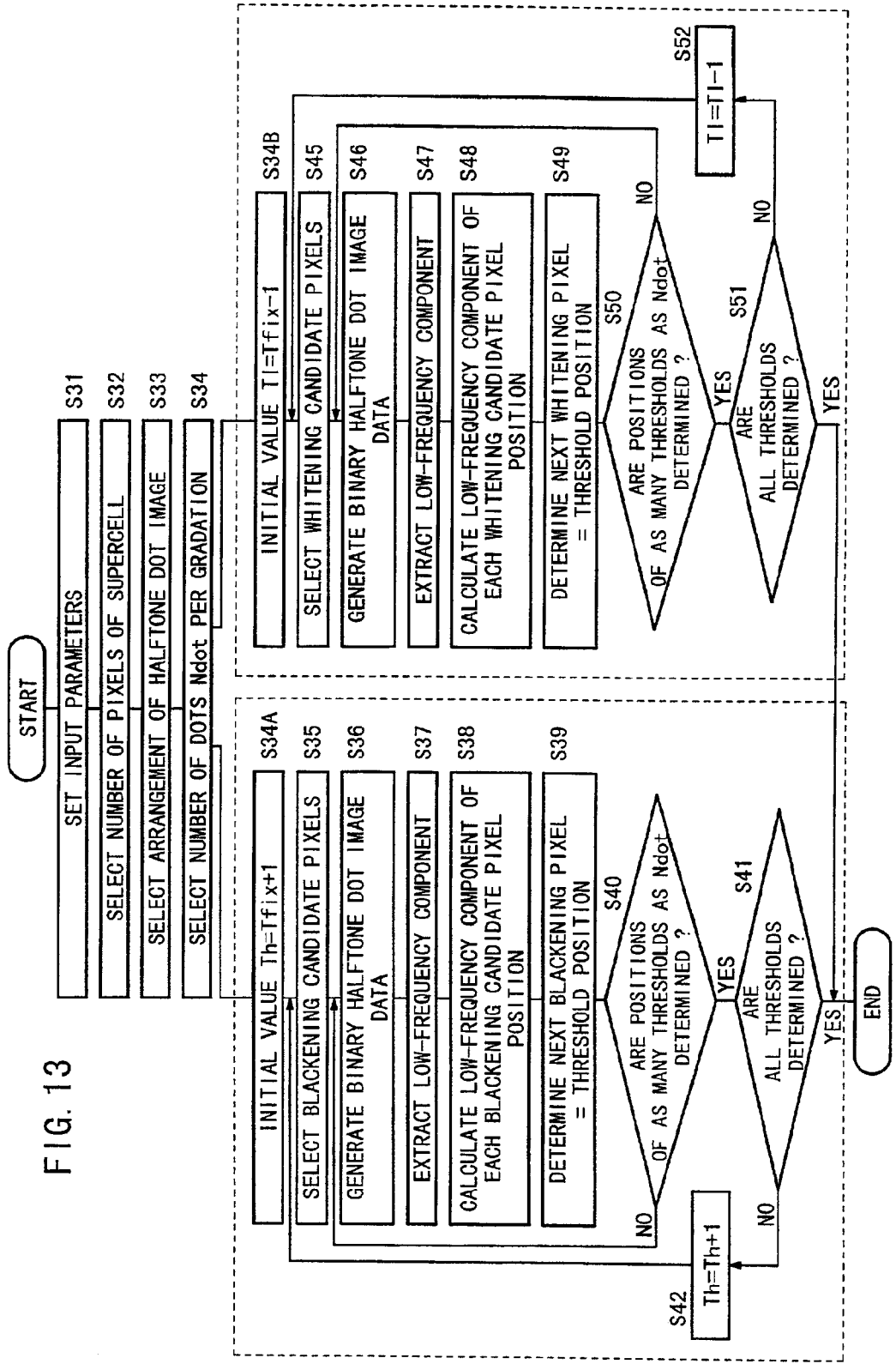
FIG. 13 is a flowchart illustrative of a process of determining a threshold arrangement if the dot pattern of a threshold at a certain gradation has been determined.

FIG. 13 is illustrative of a process of determining the position of the threshold Th at a higher gradation and the position of the threshold Tl at a lower gradation when the dot pattern of the threshold Tfix for a certain gradation has been determined.

The process shown in FIG. 13 includes steps S31–S41 (A process Aa corresponds to step S35, a process Ba1 corresponds to step S37, a process Ba2 corresponds to step S38, and a process Ba3 corresponds to step S39) which are identical to steps S1–S11 shown in FIG. 3, and steps S45–S51 (A process Ab corresponds to step S45, a process Bb1 corresponds to step S47, a process Bb2 corresponds to step S48, and a process Bb3 corresponds to step S49) which are identical to steps S5–S11 shown in FIG. 3. Therefore, these steps will not be described in detail below.

In the process shown in FIG. 13, for determining the position of the threshold Th at a next higher gradation, as described above, the thresholds T for pixels blackened by the dot pattern of the threshold Tfix are set to "0" (for blackening the pixels at all times), and the positions of thresholds T equal to or greater than the threshold Th=Tfix+1 at the next gradation as an initial value are successively determined such that those pixels are not selected as blackening candidate pixels in step S35. Step S34A represents a process of setting the threshold Th=Tfix+1 as the initial value, and step S42 represents a process of updating the threshold T to the threshold Th (Th=Th+1) at a next higher gradation.

Similarly, for determining the position of the threshold Tl at a next lower gradation, the thresholds T for pixels whitened by the dot pattern of the threshold Tfix is set to "255" (for whitening the pixels at all times), and the positions of thresholds T equal to or smaller than the threshold Tl=Tfix-1 are successively determined such that those pixels are not selected as whitening candidate pixels. Step S34B represents a process of setting the threshold Tl=Tfix-1 as the initial value, and step S52 represents a process of updating the threshold T to the threshold Tl (Tl=Tl-1) at a next lower gradation.

In step S45, as in step S5, a plurality of candidate positions for the position where a plurality of thresholds Tl of the same value for the next lower gradation are to be placed are selected so as not to impair the screen configuration. The candidate positions are referred to as whitening candidate pixels as they correspond to pixel positions of candidates to be whitened next.

For determining the positions of the thresholds Th, Tl for the next gradations, they may be determined simultaneously for one gradation, or may be determined independently such that after all the positions of thresholds Th for the higher gradation are determined, the positions of thresholds Tl for the lower gradation are determined.

It is possible to modify the system arrangement to determine the positions of thresholds in the order of increasing or decreasing magnitudes from thresholds at a plurality of different gradations corresponding to different halftone percentages.

Figure 14:
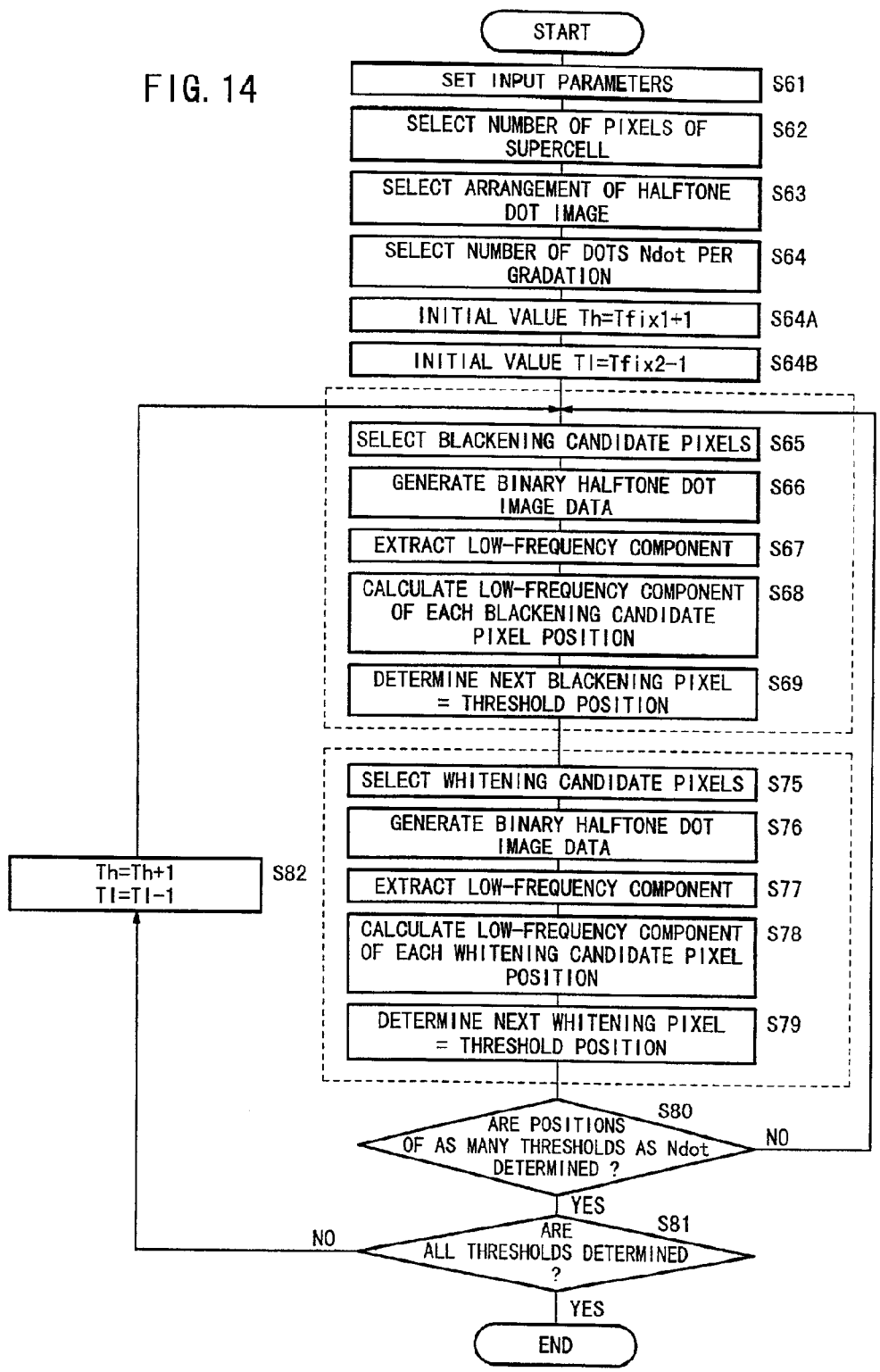
FIG. 14 is a flowchart illustrative of a process of determining a threshold arrangement if the dot pattern of a threshold at two certain different gradations has been determined.

FIG. 14 shows a process of determining the positions of thresholds between a threshold Tfix1 and a threshold Tfix2 with initial thresholds Th=Tfix1+1, Tl=Tfix2-1 determined in respective steps S64A, S64B, when the dot patterns of the thresholds Tfix1, Tfix2 (Tfix1<Tfix2) for certain two different gradations have been determined.

The process shown in FIG. 14 includes steps S61–S69, S80, S81 (A process Ac corresponds to step S65, a process Bc1 corresponds to step S67, a process Bc2 corresponds to step S68, and a process Bc3 corresponds to step S69) which are identical to steps S1–S11 shown in FIG. 3, and steps S75–S81 (A process Ad corresponds to step S75, a process Bd1 corresponds to step S77, a process Bd2 corresponds to step S78, and a process Bd3 corresponds to step S79) which are identical to steps S5–S11 shown in FIG. 3. Therefore, these steps will not be described in detail below.

According to the process shown in FIG. 14, the positions of the thresholds Th, Tl for the next higher and lower gradations are not calculated independently of each other. Instead, the thresholds Th, Tl for the next higher and lower gradations are incremented (Th=Th+1) and decremented (Tl=Tl-1) at the same time so that the positions of the thresholds agree with each other at the average value (Tfix1+Tfix2)/2, and the position of the threshold is determined for one pixel at a time with respect to the thresholds Th, Tl for the next higher and lower gradations.

For selecting candidate pixels in steps S65, S75, candidate pixels are selected from those pixels for which the position of the threshold has not been determined with respect to the thresholds Th, Tl for the next higher and lower gradations. In the example shown in FIG. 14, the threshold Th for the next higher gradation is processed prior to the threshold Tl for the next lower gradation. However, the threshold Tl for the next lower gradation may be processed first.

In this manner, it is possible to determine positions of the thresholds and to suppress the generation of a moiré pattern, while keeping the preferable dot pattern at a cetain halftone percentage corresponding to the thresholds Tfix1, Tfix2.

Further, according to the above fashion, the positions of the thresholds may be determined in the order of increasing magnitudes for halftone percentages from 0% (=Tfix1) to 50% and in the order of decreasing magnitudes for halftone percentages from 100% (=Tfix2) to 50%, wherein the threshold Tfix1 is set to be 0% (all pixels are white) and the threshold Tfix2 is set to be 100% (all pixels are black).

A process of determining a dot pattern at a certain halftone percentage, e.g., 30%, 50%, or 70%, and determining a threshold arrangement before or after the binary pattern is determined will be described below.

The positions of thresholds from 0 to 30% are determined based on the dot pattern of 30% in a decreasing order to 0% according to the process shown in FIG. 3. The positions of thresholds from 30 to 50% are determined according to the process shown in FIG. 14 such that the positions of thresholds from 30 to 40% are determined based on the dot pattern of 30% in an increasing order, and the positions of thresholds from 40 to 50% are determined based on the dot pattern of 50% in a decreasing order.

In the threshold range from 50 to 70%, the positions of thresholds from 50 to 60% are determined based on the dot pattern of 50% in an increasing order from 50%, and the positions of thresholds from 60 to 70% are determined based on the dot pattern of 70% in a decreasing order from 70%.

In the threshold range from 70 to 100%, the positions of thresholds are determined based on the dot pattern of 70% in an increasing order to 100%.

Figure 15:
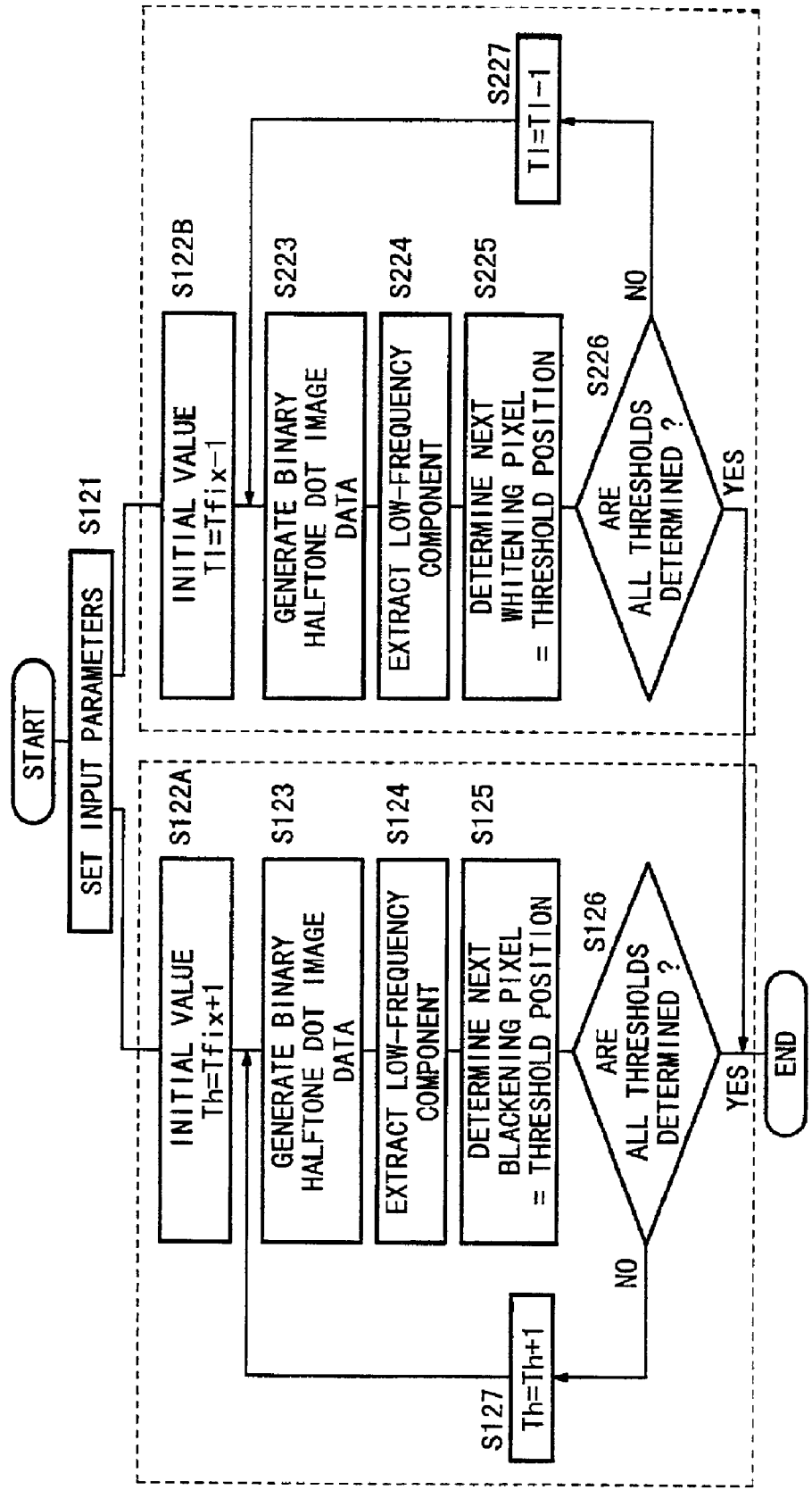
FIG. 15 is a flowchart illustrative of a process of determining the threshold arrangement of a dither matrix if the dot pattern of a threshold at a certain gradation has been determined.

FIG. 15 shows a process of determining the positions of the threshold Th at the next higher gradation and the threshold Tl at the next lower gradation when the dot pattern of a certain threshold Tfix has been determined in the threshold arrangement of a dither matrix, rather than halftone dots.

The process shown in FIG. 15 includes steps S121, S123–S126 (A step (1) corresponds to step S124, and a step (2) corresponds to step S125 which are identical to steps S21, S23–S26 shown in FIG. 12, and steps S223–S226 (A step (4) corresponds to step S224, and a step (5) corresponds to step S225) which are identical to steps S23–S26 shown in FIG. 12. Therefore, these steps will not be described in detail below.

In step S122A, the threshold Th=Tfix+1 is set as an initial value. In step S127, it is updated to the threshold Th=Th+1 at the next higher gradation.

In step S122B, the threshold Tfix−1 is set as an initial value. In step S227, it is updated to the threshold Tl=Tl−1 at the next lower gradation.

In this fashion, the overall threshold arrangement of a dither matrix where the dot pattern of the threshold T=Tfix at a certain gradation has been determined. This threshold arrangement is capable of suppressing the generation of a moiré pattern in the vicinity of the threshold T=Tfix, while keeping the dot pattern of the determined threshold T=Tfix. The dither matrix with the determined threshold arrangement can be stored in the recording medium 49.

Figure 16:
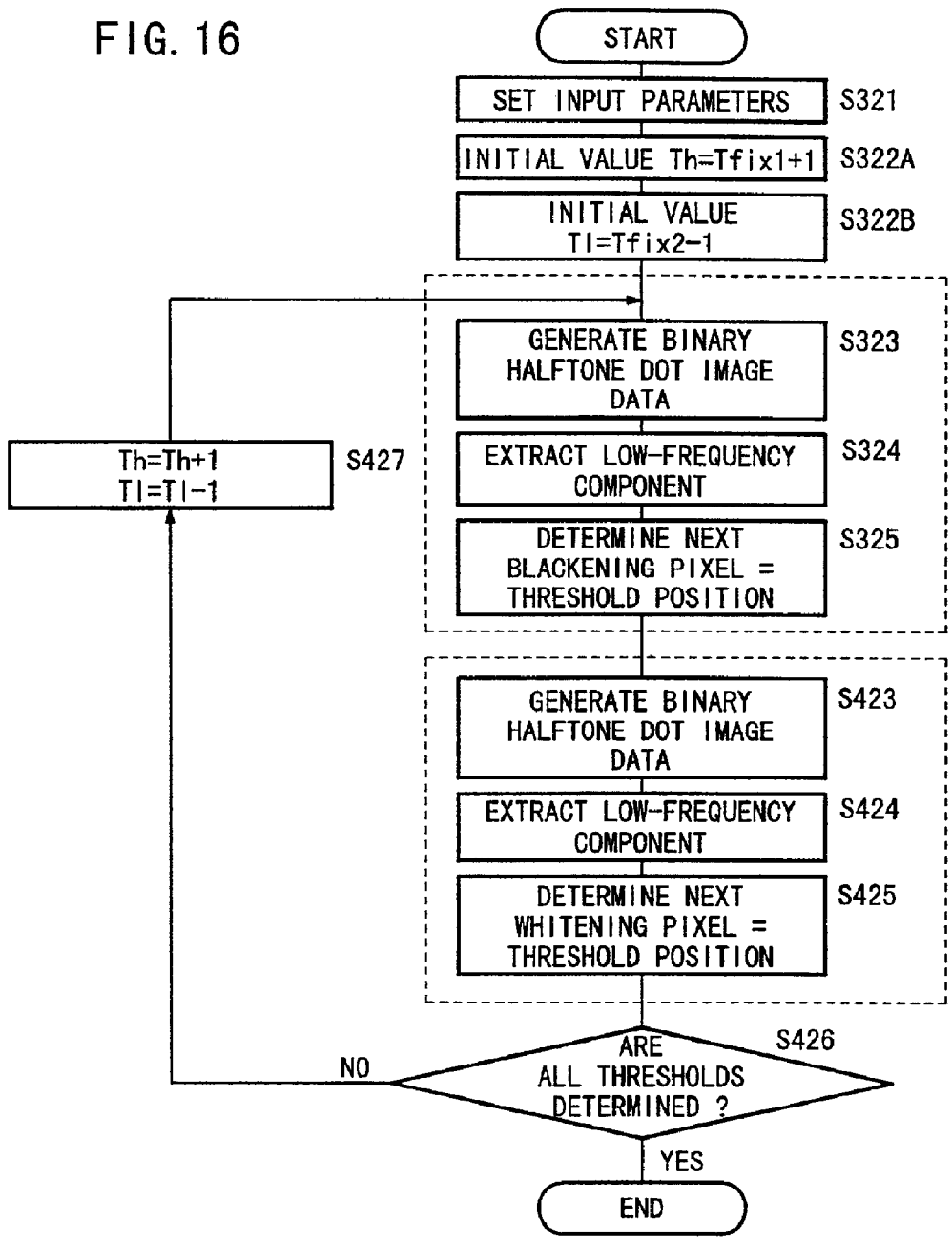
FIG. 16 is a flowchart illustrative of a process of determining the threshold arrangement of a dither matrix if the dot pattern of a threshold at two certain different gradations has been determined.

FIG. 16 shows a process of determining the positions of thresholds T between a threshold Tfix1 and a threshold Tfix2, when the dot patterns of the thresholds Tfix 1, Tfix2 (Tfix1<Tfix2) for certain plural different gradations have been determined, in the threshold arrangement of a dither matrix, rather than halftone dots.

The process shown in FIG. 16 includes steps S321, S323–S325 (A step (1) corresponds to step S324, and a step (2) corresponds to step S325) which are identical to steps S21, S23–S25 shown in FIG. 12, and steps S423–S426 (A step (3) corresponds to step S424, and a step (4) corresponds to step S425) which are identical to steps S23–S26 shown in FIG. 12. Therefore, these steps will not be described in detail below.

In steps S322A, S322B, the thresholds Th=Tfix1+1, Tl=Tfix2−1 are set as initial values. In step S427, they are updated to the thresholds Th=Th+1, Tl=Tl−1 at the next higher and lower gradations.

The threshold Th=Tfix1+1 as the initial value and the updated threshold Th=Th+I are used in the process of determining the position of the threshold Th at the higher gradation in steps S323–S325, and the threshold Tl=Tfix2−1 as the initial value and the updated threshold Tl=Tl−1 are used in the process of determining the position of the threshold Tl at the lower gradation in steps S423–S425.

The positions of thresholds equal to and smaller than the threshold Tfix 1 at the lower gradation may be determined according to steps S122B, S223–S227 shown in FIG. 15, and the positions of thresholds equal to and greater than the threshold Tfix2 at the higher gradation may be determined according to steps S122A, S123–S127 shown in FIG. 15.

In this fashion, the overall threshold arrangement of a dither matrix where the dot pattern of the thresholds T=Tfix1, Tfix2 at different plural gradations has been determined. Accordingly, this threshold arrangement can be determined such that it is capable of suppressing the generation of a moiré pattern even between the thresholds T=Tfix 1 and Tfix2, while keeping the preferable dot pattern at a certain halftone percentage corresponding to the thresholds Tfix1, Tfix2. The dither matrix with the determined threshold arrangement can be stored in the recording medium 49.

Further, according to the above fashion, the threshold arrangement may be determined in an increasing order for halftone percentages from 0% (=Tfix1) to 50% and in a decreasing order for halftone percentages from 100% (Tfix2) to 50%, wherein the threshold Tfix1 is set to be 0% (all white) and the threshold Tfix2 is set to be 100% (all black).

According to the present invention, it is possible to determine a threshold arrangement for minimizing periodic patterns or moiré patterns.

According to the present invention, it is also possible to minimize low-frequency components such as a moiré pattern in a gradation image that is represented by outputted gradation image data.

Although a certain preferred embodiment of the present invention has been shown and described in detail, it should be understood that various changes and modifications may be made therein without departing from the scope of the appended claims.

What is claimed is:

1. A method of determining a threshold arrangement for generating a gradation image to determine a position of at least one threshold of the same value for a next gradation when positions of thresholds ranging from a smaller threshold to a threshold for a given gradation are determined in a threshold arrangement, comprising the steps of:

(A) determining at least one candidate position for the position of at least one threshold of the same value for the next gradation; and (B) determining the position of the threshold for the next gradation from said candidate position, said step (B) comprising the steps of:

extracting a low-frequency component from image data obtained based on the threshold arrangement in which the positions of the thresholds ranging to said threshold for the given gradation are determined (1st step);

determining a low-frequency component intensity at said at least one candidate position (2nd step);

determining the candidate position where the determined low-frequency component intensity is weakest as the position of the threshold for the next gradation (3rd step); and repeating said step of extracting a low-frequency component, said step of determining a low-frequency component intensity, and said step of determining the candidate position until all positions of at least one threshold of the same value for the next gradation are determined.

2. A method according to claim 1, wherein said threshold arrangement comprises a threshold arrangement for generating a halftone dot gradation image.

3. A method according to claim 1, wherein said step of extracting a low-frequency component comprises the step of:
   weighting a low-frequency component according to human visual characteristics and extracting the weighted low-frequency component.

4. A method of determining a threshold arrangement for generating a gradation image to determine a position of at least one threshold of the same value for a next gradation when positions of thresholds ranging from a greater threshold to a threshold for a given gradation are determined in a threshold arrangement, comprising the steps of:
   (A) determining at least one candidate position for the position of at least one threshold of the same value for the next gradation; and
   (B) determining the position of the threshold for the next gradation from said candidate position,
   said step (B) comprising the steps of:
   extracting a low-frequency component from image data obtained based on the threshold arrangement in which the positions of the thresholds ranging to said threshold for the given gradation are determined (1st step);
   determining a low-frequency component intensity at said at least one candidate position (2nd step);
   determining the candidate position where the determined low-frequency component intensity is strongest as the position of the threshold for the next gradation (3rd step); and
   repeating said step of converting image data, said step of determining a low-frequency component intensity, and said step of determining the candidate position until all positions of at least one threshold of the same value for the next gradation are determined.

5. A method according to claim 4, wherein said threshold arrangement comprises a threshold arrangement for generating a halftone dot gradation image.

6. A method according to claim 4, wherein said step of extracting a low-frequency component comprises the step of:
   weighting a low-frequency component according to human visual characteristics and extracting the weighted low-frequency component.

7. A method of determining a threshold arrangement for generating a gradation image to determine a position of at least one threshold for a next gradation when positions of thresholds ranging from a smaller threshold to a threshold for a given gradation are determined in a threshold arrangement, comprising the steps of:
   extracting a low-frequency component from image data obtained based on the threshold arrangement in which the positions of the thresholds ranging to said threshold for the
   given gradation are determined (1st step); and determining the position where the intensity of the extracted low-frequency component is weakest as the position of the threshold for the next gradation (2nd step).

8. A method according to claim 7, wherein said threshold arrangement comprises a dither matrix.

9. A method according to claim 7, wherein said step of extracting a low-frequency component comprises the step of:
   weighting a low-frequency component according to human visual characteristics and extracting the weighted low-frequency component.

10. A method of determining a threshold arrangement for generating a gradation image to determine a position of at least one threshold for a next gradation when positions of thresholds ranging from a greater threshold to a threshold for a given gradation are determined in a threshold arrangement, comprising the steps of:
   extracting a low-frequency component from image data obtained based on the threshold arrangement in which the positions of the thresholds ranging to said threshold for the given gradation are determined (1st step); and determining the position where the intensity of the extracted low-frequency component is strongest as the position of the threshold for the next gradation (2nd step).

11. A method according to claim 10, wherein said threshold arrangement comprises a dither matrix.

12. A method according to claim 10, wherein said step of extracting a low-frequency component comprises the step of:
   weighting a low-frequency component according to human visual characteristics and extracting the weighted low-frequency component.

13. An apparatus for generating gradation image data, comprising:
   a recording medium for storing a plurality of threshold arrangements for generating gradation image data;
   selecting means for selecting a threshold arrangement from the threshold arrangements stored in said recording medium; and
   gradation image data generating means for generating gradation image data using the threshold arrangement selected by said selecting means;
   wherein each of the threshold arrangements stored in said recording medium comprises such a threshold arrangement;
   that a low-frequency component is extracted from gradation image data generated by said gradation image data generating means based on a threshold arrangement ranging from a smaller threshold to a threshold for a given gradation; and
   thereafter the position of a threshold for a gradation next to said given gradation is a position where a low-frequency component is weakest among the extracted low-frequency component.

14. An apparatus for generating gradation image data, comprising:
   a recording medium for storing a plurality of threshold arrangements for generating gradation image data;
   selecting means for selecting a threshold arrangement from the threshold arrangements stored in said recording medium; and
   gradation image data generating means for generating gradation image data using the threshold arrangement selected by said selecting means;
   wherein each of the threshold arrangements stored in said recording medium comprises such a threshold arrangement that a low-frequency component is extracted from gradation image data generated by said gradation image data generating means based on a threshold arrangement ranging from a greater threshold to a threshold for a given gradation, and thereafter the position of a threshold for a gradation next to said given gradation is a position where a low-frequency component is strongest among the extracted low-frequency component.

15. A method of determining a threshold arrangement for generating a gradation image to determine positions of thresholds for gradations higher and lower than a given gradation when a dot pattern for the given gradation is determined, comprising the steps of:

determining positions of thresholds for higher gradations; and determining positions of thresholds for lower gradations, said step of determining positions of thresholds for higher gradations comprising the steps of:

(Aa) determining at least one candidate position for the position of at least one threshold (Th, having Tfix+1 as an initial value) of the same value for the next gradation higher than the given gradation;

(Ba) determining the position of the threshold (Th) for the next gradation from said candidate position;

(Ca) updating the threshold (Th) with an increment thereof by 1 (Th+1→Th) and repeating said steps (Aa), (Ba), and (Ca) until all positions of the thresholds for gradations higher than the given gradation are determined, said step (Ba) comprising the steps of:

(Ba1) extracting a low-frequency component from image data obtained based on the threshold arrangement in which the positions of the threshold (Th−1) for the gradation are determined;

(Ba2) determining a low-frequency component intensity at said at least one candidate position;

(Ba3) determining the candidate position where the determined low-frequency component intensity is weakest as the position of the threshold (Th) for the next gradation; and repeating said steps (Ba1), (Ba2), and (Ba3) until all positions of said at least one threshold (Th) of the same value for the next gradation are determined, said step of determining positions of thresholds for lower gradations comprising the steps of:

(Ab) determining at least one candidate position for the position of at least one threshold (T1, having Tfix.1 as an initial value) of the same value for the next gradation lower than the given gradation;

(Bb) determining the position of the threshold (T1) for the next gradation from said candidate position;

(Cb) updating the threshold (T1) with a decrement thereof by 1 (T1→1→T1) and repeating said steps (Ab), (Bb), and (Cb) until all positions of the thresholds for gradations lower than the given gradation are determined, said step (Bb) comprising the steps of:

(Bb1) extracting a low-frequency component from image data obtained based on the threshold arrangement in which the positions of the threshold (T1+1) for the gradation are determined;

(Bb2) determining a low-frequency component intensity at said at least one candidate position;

(Bb3) determining the candidate position where the determined low-frequency component intensity is strongest as the position of the threshold (T1) for the next gradation; and repeating said steps (Bb1), (Bb2), and (Bb3) until all positions of said at least one threshold (T1) of the same value for the next gradation are determined.

16. A method according to claim 15, wherein said threshold arrangement comprises a threshold arrangement for generating a halftone dot gradation image.

17. A method according to claim 15, wherein said step (Ba1) comprises the step of:

weighting a low-frequency component according to human visual characteristics and extracting the weighted low-frequency component.

18. A method of determining a threshold arrangement for generating a gradation image to determine positions of thresholds for gradations between two given gradations when two dot patterns for the two given gradations are respectively determined, comprising the steps of:

(Ac) determining at least one candidate position for the position of at least one first threshold (Th, having Tfix1+1 as an initial value) of the same value for the next gradation higher than one of the given gradations having the smaller threshold (Tfix1);

(Bc) determining the position of the first threshold (Th) for the next gradation from said candidate position determined in the step (Ac);

(Ad) determining at least one candidate position for the position of at least one second threshold (T1, having Tfix2.1 as an initial value) of the same value for the next gradation lower than the other of the given gradations having the greater threshold (Tfix2);

(Bd) determining the position of the second threshold (T1) for the next gradation from said candidate position determined in the step (Ad);

(Cc) updating the first and second thresholds (Th and T1) with an increment of the first threshold (Th) by 1 (Th+1→Th) and a decrement of the second threshold (T1) by 1 (T1−1 →T1) and repeating said steps (Ac), (Bc), (Ad), and (Bd) until all positions of the thresholds between the thresholds (Tfix1 and Tfix2) for the given different gradations are determined, said step (Bc) comprising the steps of:

(Bc1) extracting a low-frequency component from image data obtained based on the threshold arrangement in which the positions of the first threshold (Th.1) for the gradation are determined;

(Bc2) determining a low-frequency component intensity at said at least one candidate position; and (Bc3) determining the candidate position where the determined low-frequency component intensity is weakest as the position of the first threshold (Th) for the next gradation, said step (Bd) comprising the steps of:

(Bd1) extracting a low-frequency component from image data obtained based on the threshold arrangement in which the positions of the second threshold (T1+1) for the gradation are determined;

(Bd2) determining a low-frequency component intensity at said at least one candidate position; and (Bd3) determining the candidate position where the determined low-frequency component intensity is strongest as the position of the second threshold (T1) for the next gradation.

19. A method according to claim 18, wherein said threshold arrangement comprises a threshold arrangement for generating a halftone dot gradation image.

20. A method according to claim 18, wherein said step (Bc-1) of extracting a low-frequency component comprises the step of:

weighting a low-frequency component according to human visual characteristics and extracting the weighted low-frequency component.

21. A method according to claim 19, wherein said step (Bc1) of extracting a low-frequency component comprises the step of:

weighting a low-frequency component according to human visual characteristics and extracting the weighted low-frequency component.

22. A method of determining a threshold arrangement for generating a gradation image to determine positions of thresholds for gradations higher and lower than a given gradation when a dot pattern for the given gradation is determined in the threshold arrangement, comprising the steps of:

determining positions of thresholds for higher gradations; and determining positions of thresholds for lower gradations, said step of determining positions of thresholds for higher gradations comprising the steps of:

(1) converting image data obtained based on the threshold arrangement in which the positions of the threshold (Th−1) for the gradation are determined into data in a frequency space and extracting a low-frequency component from the data;

(2) determining a position where the low-frequency component intensity is weakest as the position of the threshold (Th) for the next higher gradation; and (3) updating the threshold (Th) with an increment thereof by 1 (Th+1→Th) and repeating said steps (1), (2), and (3) until all positions of the thresholds for gradations higher than the given gradation are determined, said step of determining positions of thresholds for lower gradations comprising the steps of:

(4) converting image data obtained based on the threshold arrangement in which the positions of the threshold (T1+1) for the gradation are determined into data in a frequency space and extracting a low-frequency component from the data;

(5) determining a position where the low-frequency component intensity is strongest as the position of the threshold (T1) for the next lower gradation; and (6) updating the threshold (T1) with a decrement thereof by 1 (T1−1 →T1) and repeating said steps (4), (5), and (6) until all positions of the thresholds for gradations lower than the given gradation are determined.

23. A method according to claim 22, wherein said threshold arrangement comprises a dither matrix.

24. A method according to claim 22, wherein said step (1) of extracting a low-frequency component comprises the step of:

weighting a low-frequency component according to human visual characteristics and extracting the weighted low-frequency component.

25. A method of determining a threshold arrangement for generating a gradation image to determine positions of thresholds for gradations between two given gradations when two dot patterns for the given gradations are respectively determined, comprising the steps of:

(1) converting image data obtained based on the threshold arrangement in which the positions of the threshold (Tfix1=Th−1) for the given gradation are determined into data in a frequency space and extracting a low-frequency component from the data;

(2) determining a position where the low-frequency component intensity is weakest as the position of a first threshold (Th) for the next higher gradation;

(3) converting image data obtained based on the threshold arrangement in which the positions of the threshold (Tfix2=T1+1) for the given gradation are determined into data in a frequency space and extracting a low-frequency component from the data;

(4) determining a position where the low-frequency component intensity is strongest as the position of a second threshold (T1) for the next lower gradation;

(5) updating the first and second thresholds (Th and T1) with an increment of first threshold (Th) by 1 (Th+1→Th) and a decrement of second threshold (T1) by 1 (T1−1→T1); and repeating said steps (1), (2), (3), (4), and (5) until all positions of the thresholds between the thresholds (Tfix1 and Tfix2) for the given different gradations are determined.

26. A method according to claim 25, wherein said threshold arrangement comprises a dither matrix.

27. A method according to claim 25, wherein said step (1) of extracting a low-frequency component comprises the step of:

weighting a low-frequency component according to human visual characteristics and extracting the weighted low-frequency component.

28. A method according to claim 26, wherein said step (1) of extracting a low-frequency component comprises the step of:

weighting a low-frequency component according to human visual characteristics and extracting the weighted low-frequency component.

* * * * *